(12) United States Patent
Yoshioka et al.

(10) Patent No.: US 9,372,371 B2
(45) Date of Patent: Jun. 21, 2016

(54) LIQUID CRYSTAL DISPLAY PANEL, AND LIQUID CRYSTAL DISPLAY DEVICE

(75) Inventors: Takatomo Yoshioka, Osaka (JP); Iori Aoyama, Osaka (JP); Takao Imaoku, Osaka (JP); Yuichi Iyama, Osaka (JP); Kazuhiko Tsuda, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 247 days.

(21) Appl. No.: 14/126,455

(22) PCT Filed: May 31, 2012

(86) PCT No.: PCT/JP2012/064216
§ 371 (c)(1),
(2), (4) Date: Dec. 16, 2013

(87) PCT Pub. No.: WO2013/001980
PCT Pub. Date: Jan. 3, 2013

(65) Prior Publication Data
US 2014/0132906 A1 May 15, 2014

(30) Foreign Application Priority Data
Jun. 27, 2011 (JP) ................ 2011-142350

(51) Int. Cl.
*G02F 1/1343* (2006.01)
*G02F 1/1368* (2006.01)
*G02F 1/1337* (2006.01)

(52) U.S. Cl.
CPC .... *G02F 1/134309* (2013.01); *G02F 1/133707* (2013.01); *G02F 2001/134372* (2013.01); *G02F 2001/134381* (2013.01)

(58) Field of Classification Search
None
See application file for complete search history.

(56) References Cited

U.S. PATENT DOCUMENTS

| 2005/0024548 | A1 | 2/2005 | Choi et al. | |
|---|---|---|---|---|
| 2008/0002079 | A1* | 1/2008 | Kimura | G02B 6/0051 349/42 |
| 2009/0033848 | A1* | 2/2009 | Oka | G02F 1/134363 349/114 |
| 2011/0249038 | A1* | 10/2011 | Yamazaki | G09G 3/3413 345/690 |
| 2012/0154730 | A1* | 6/2012 | Sakurai | G02F 1/134363 349/141 |
| 2014/0192298 | A1* | 7/2014 | Sumiyoshi | G02F 1/134336 349/96 |
| 2014/0198099 | A1* | 7/2014 | Tseng | G02B 27/2214 345/419 |

FOREIGN PATENT DOCUMENTS

| JP | 2002-365657 A | 12/2002 |
|---|---|---|
| JP | 2006-523850 A | 10/2006 |
| WO | 2011/024495 A1 | 3/2011 |

OTHER PUBLICATIONS

Official Communication issued in International Patent Application No. PCT/JP2012/064216, mailed on Jul. 17, 2012.

(Continued)

*Primary Examiner* — Ryan Crockett
(74) *Attorney, Agent, or Firm* — Keating & Bennett, LLP

(57) ABSTRACT

The present invention provides a liquid crystal display panel which is capable of providing a sufficiently high response speed and an excellent transmittance, and a liquid crystal display device. The liquid crystal display panel of the present invention includes a first substrate, a second substrate, and a liquid crystal layer disposed between the substrates. The first substrate and the second substrate have electrodes. The electrodes of the second substrate include a pair of comb-shaped electrodes and a slit-formed electrode.

10 Claims, 26 Drawing Sheets

(56) References Cited

OTHER PUBLICATIONS

Imaoku et al.; "Liquid Crystal Display Panel and Liquid Crystal Display Device"; U.S. Appl. No. 14/126,461, filed Dec. 16, 2013.
Iyama et al.; "Liquid Crystal Drive Device and Liquid Crystal Display Device"; U.S. Appl. No. 14/126,458, filed Dec. 16, 2013.
Aoyama et al.; "Liquid Crystal Display Panel and Liquid Crystal Display Device"; U.S. Appl. No. 14/126,459, filed Dec. 16, 2013.

* cited by examiner

LIQUID CRYSTAL DISPLAY PANEL, AND LIQUID CRYSTAL DISPLAY DEVICE

TECHNICAL FIELD

The present invention relates to a liquid crystal display panel and a liquid crystal display device. The present invention specifically relates to a liquid crystal display panel which has a three-layered electrode structure that controls the alignment of the liquid crystal molecules by an electric field in both of rising and falling, and a liquid crystal display device.

BACKGROUND ART

Liquid crystal display panels include a pair of glass substrates and a liquid crystal display element disposed therebetween. Owing to its characteristics, including a thin profile, a light weight, and a low power consumption, such a liquid crystal display panel is indispensable in everyday life and business as a display panel for devices including personal computers, televisions, onboard devices (e.g. automotive navigation systems), and personal digital assistants (e.g. mobile phones). In these applications, persons skilled in the art have studied liquid crystal display panels of various modes with different electrode arrangements and different substrate designs for changing the optical characteristics of the liquid crystal layer.

Examples of the display modes of current liquid crystal display devices include: a vertical alignment (VA) mode in which liquid crystal molecules having negative anisotropy of dielectric constant are aligned vertically to the substrate surface; an in-plane switching (IPS) mode in which liquid crystal molecules having positive or negative anisotropy of dielectric constant are aligned horizontally to the substrate surface and a transverse electric field is applied to the liquid crystal layer; and fringe field switching (FFS).

One document discloses, as a FFS-driving liquid crystal display device, a thin-film-transistor liquid crystal display having a high response speed and a wide viewing angle. The device includes a first substrate having a first common electrode layer; a second substrate having a pixel electrode layer and a second common electrode layer; a liquid crystal disposed between the first substrate and the second substrate; and a means for generating an electric field between the first common electrode layer of the first substrate and both of the pixel electrode layer and the second common electrode layer of the second substrate so as to provide a high speed response to a fast input-data-transfer rate and a wide viewing angle for a viewer (for example, see Patent Literature 1).

Another document discloses, as a liquid crystal device with multiple electrodes applying a transverse electric field, a liquid crystal device including a pair of substrates opposite to each other; a liquid crystal layer which includes a liquid crystal having a positive anisotropy of dielectric constant and which is disposed between the substrates; electrodes which are provided to the respective first and second substrates constituting the pair of substrates, facing each other with the liquid crystal layer therebetween, and which apply a vertical electric field to the liquid crystal layer; and multiple electrodes for applying a transverse electric field to the liquid crystal layer disposed on the second substrate (for example, see Patent Literature 2).

CITATION LIST

Patent Literature

Patent Literature 1: JP 2006-523850 T
Patent Literature 2: JP 2002-365657 A

SUMMARY OF INVENTION

Technical Problem

Patent Literature 1 discloses a vertical alignment liquid crystal display device having three-layered electrode structure, which enables high-speed response by rotating the liquid crystal molecules by an electric field in both rising and falling. The rising (where the display state changes from a dark state (black display) to a bright state (white display)) utilizes a fringe electric field (FFS driving) generated between an upper slit and a lower planar electrode of the lower substrate. The falling (where the display state changes from a bright state (white display) to a dark state (black display)) utilizes a vertical electric field generated by a potential difference between the substrates.

FIG. 24 is a schematic cross-sectional view showing a liquid crystal display panel having a FFS driving electrode structure whose lower substrate has a conventional FFS structure. FIG. 25 is a schematic plan view showing one pixel of a liquid crystal display panel having a FFS structure. FIG. 26 shows simulation results of the distribution of director d, the electric field distribution, and the transmittance distribution (solid line) in rising in the liquid crystal display panel shown in FIG. 24. FIG. 24 shows the structure of the liquid crystal display panel. A slit electrode 417 shown in FIG. 25 is supplied with a certain voltage (14 V in this figure), and the substrate having the slit electrode 417 and the opposed substrate are provided with a lower electrode 413 and a counter electrode 423, respectively. The voltages applied to the lower electrode 413 and the counter electrode 423 are 7 V.

Application of a fringe electric field in a vertical alignment liquid crystal display device as mentioned above only rotates the liquid crystal molecules near the slit electrode edges. This may cause an insufficient transmittance (FIG. 26). The present inventors have found it possible to provide a good transmittance by the use of a pair of comb-shaped electrodes instead of an upper slit electrode to implement comb driving, thereby sufficiently aligning the liquid crystal molecules between the comb-shaped electrodes in the horizontal direction.

Voltages are applied not only to upper electrodes that generate a transverse electric field but also to the counter electrode and the lower electrode in rising of the comb driving in the three-layered electrode structure. Thus, such voltages may serve to obstruct the transverse electric field by the upper electrodes, thereby decreasing the transmittance. There is a demand for devising means for improving the transmittance.

Such a disadvantage can be solved by keeping the lower and counter electrodes away from each other. However, this causes a greater cell thickness, possibly resulting in poor viewing angle characteristics (especially, poor viewing angle compensation by a polarizing plate) and cost issues such as an increase in the amount of liquid crystal. Therefore, this is not a realistic solution.

Patent Literature 2 discloses improvement of the response speed by the use of comb-shape driving in a liquid crystal display device having a three-layered electrode structure. However, the document discloses substantially only the case of a liquid crystal device whose display mode is a twisted nematic (TN) mode. The document fails to disclose vertical alignment liquid crystal display devices which are advantageous for providing such characteristics as a wide viewing angle and a high contrast. The document also fails to disclose the improvement in transmittance and the relationship between the electrode structure and the transmittance.

The present invention is devised in view of the above situation, and aims to provide a liquid crystal display panel having a three-layered electrode structure that controls the alignment of the liquid crystal molecules by an electric field in both of rising and falling, and a liquid crystal display device, which are capable of providing a sufficiently high response speed and an excellent transmittance.

Solution to Problem

The present inventors have performed studies for providing a high response speed and a high transmittance together in a vertical alignment liquid crystal display panel and liquid crystal display device, and thereby have focused on a three-layered electrode structure which controls the alignment of the liquid crystal molecules by an electric field in both rising and falling. Then, the inventors have performed further studies on the electrode structure, and have found that the line of electric force is strongly pulled down in the ON state and thereby the transmittance is decreased in the aforementioned conventional mode where the lower electrode is a planar electrode without a slit. The inventors have further found that the transmittance in the comb-shaped electrode driving can be increased by providing a slit for the lower electrode. The electrode of the lower substrate is closer to the comb-shaped electrodes (e.g. upper electrodes) than the counter electrode of the upper substrate, and an insulating layer (dielectric layer) usually exists between the comb-shaped electrodes and the planar electrode (e.g. lower electrode), easily pulling the line of electric force and obstructing the transverse electric field generated by the comb-shaped electrodes to a higher degree. Subsequently, the inventors have found that disposing a slit on the planar electrode (e.g. lower electrode) enables controlling of the line of electric force, which is pulled down in the case where the lower electrode is a planar electrode, thereby improving the transmittance in rising.

In the present invention, a vertical alignment liquid crystal display device having a three-layered electrode structure implements comb driving with a pair of comb-shaped electrodes as the upper electrodes of the lower substrate, for example; such driving generates a transverse electric field by a potential difference between the comb-shaped electrodes in rising and generates a vertical electric field by a potential difference between the substrates in falling, thereby rotating the liquid crystal molecules by an electric field in both the rising and the falling to provide a high response speed, and also provide a high transmittance owing to the transverse electric field in the comb driving. The present invention is differentiated from the above patent literature in these respects. The present invention can further solve a markedly poor response speed in a low-temperature environment.

Although the aforementioned patent literature documents disclose no mode of disposing a slit on the lower electrode, such a structure has a limitation on the transmittance which the structure can provide. In order to further improve the transmittance, not only the driving method but also the electrode structure should be focused on. Thus, the inventors propose a novel three-electrode-structure liquid crystal display panel and liquid crystal display device with a slit formed on the lower electrode for improving the transmittance. In order to provide the effects of the present invention, preferably, the upper electrode is a pair of comb-shaped electrodes and the lower electrode is a slit-formed electrode. Still, the effects of the present invention can also be provided even in the case where the upper electrode is a slit-formed electrode and the lower electrode is a pair of comb-shaped electrodes.

In other words, the present invention relates to a liquid crystal display panel including a first substrate, a second substrate, and a liquid crystal layer disposed between the substrates, the first substrate and the second substrate including electrodes, and the electrodes of the second substrate including a pair of comb-shaped electrodes and a slit-formed electrode.

The "slit-formed electrode" herein is at least regarded as having a slit in the technical field of the present invention. The slit may be formed such that the portions surrounding the slit of the electrode are electrically connected into one part, or may be formed so as to divide the portion surrounding the slit of the electrode into two or more portions without electric connection. The slit-formed electrode may partially have a planar region having no slit as long as it is capable of providing the effects of the present invention.

The slit-formed electrode preferably overlaps at least one of the pair of comb-shaped electrodes in a plan view of the main surfaces of the substrates. This enables sufficient reduction in the transmittance in the OFF state, while maintaining the OFF-state characteristics, in other words, sufficiently increasing the response speed in the OFF state as well as sufficiently improving the transmittance in the ON state. The slit-formed electrode more preferably overlaps substantially the whole of the at least one of the pair of comb-shaped electrodes in a plan view of the main surfaces of the substrates. The slit-formed electrode preferably protrudes (extends) from the at least one of the pair of comb-shaped electrodes in a plan view of the main surfaces of the substrates.

The at least one of the pair of comb-shaped electrodes is preferably electrically connected with the slit-formed electrode. In particular, the comb-shaped electrode which overlaps the slit-formed electrode in a plan view of the main surfaces of the substrates is preferably electrically connected with the slit-formed electrode. The number of driving TFTs per subpixel is particularly preferably two or less.

The slit-formed electrode may also not overlap the pair of comb-shaped electrodes in a plan view of the main surfaces of the substrates. This is also one preferable mode of the present invention. This makes it possible to provide a sufficiently excellent transmittance and to sufficiently apply a vertical electric field in falling, thereby providing excellent OFF-state characteristics. The slit-formed electrode is preferably disposed so as to overlap the center of a space between the pair of comb-shaped electrodes in a plan view of the main surfaces of the substrates (the "space" herein also means the region between tooth portions of the pair of comb-shaped electrodes in a plan view of the main surfaces of the substrates). The slit-formed electrode preferably protrudes from one of the pair of comb-shaped electrodes in the direction of the space width in a plan view of the main surfaces of the substrates (the direction orthogonal to the longitudinal direction of the comb-shaped electrode in a plan view of the main surfaces of the substrates) by half or less of the width of the space between the pair of comb-shaped electrodes.

The slit-formed electrode preferably overlaps both of the pair of comb-shaped electrodes in a plan view of the main surfaces of the substrates. This is also one preferable mode. The slit-formed electrode more preferably overlaps substantially the whole of both of the pair of comb-shaped electrodes in a plan view of the main surfaces of the substrates.

At least part of an edge of the slit-formed electrode preferably does not overlap the pair of comb-shaped electrodes in a plan view of the main surfaces of the substrates.

For example, the slit-formed electrode preferably protrudes in the space-width direction by 70% or less of the space width between the pair of comb-shaped electrodes. For example, the at least part of an edge of the slit-formed electrode is preferably apart from the pair of comb-shaped electrodes by 0.5 μm or greater but 0.7 S μm or smaller in a plan view of the main surfaces of the substrates, where S (μm) represents the width of the gap between tooth portions of the pair of comb-shaped electrodes.

The slit-formed electrode preferably exists on a layer different from the layer on which the pair of comb-shaped electrodes exists. The slit planar electrode is usually formed such that it sandwiches an electrically resistant layer with a pair of comb-shaped electrodes. The electrically resistant layer is preferably an insulating layer. The "insulating layer" herein is at least regarded as an insulating layer in the technical field.

The pair of comb-shaped electrodes at least satisfies that two comb-shaped electrodes are disposed opposite to each other in a plan view of the main faces of the substrates. This pair of comb-shaped electrodes suitably generates a transverse electric field therebetween. With a liquid crystal layer including liquid crystal molecules having positive anisotropy of dielectric constant, the response performance and the transmittance are excellent in rising. With a liquid crystal layer including liquid crystal molecules having negative anisotropy of dielectric constant, the liquid crystal molecules are rotated by a transverse electric field to provide a high response speed in falling. The electrodes of the first substrate and the second substrate at least provide a potential difference between the substrates. This generates a vertical electric field by the potential difference between the substrates in falling with a liquid crystal layer including liquid crystal molecules having positive anisotropy of dielectric constant and in rising with a liquid crystal layer including liquid crystal molecules having negative anisotropy of dielectric constant, and rotates the liquid crystal molecules by the electric field to provide a high response speed.

The pair of comb-shaped electrodes may be disposed on the same layer or the pair of comb-shaped electrodes may be disposed on different layers as long as it provides the effects of the present invention. The pair of comb-shaped electrodes is preferably disposed on the same layer. The phrase "a pair of comb-shaped electrodes is disposed on the same layer" and its derivative forms herein means that the comb-shaped electrodes are in contact with the same component (e.g. insulating layer, liquid crystal layer) on the liquid crystal layer side and/or the side opposite to the liquid crystal layer side.

The pair of comb-shaped electrodes preferably satisfies that the tooth portions are along each other in a plan view of the main faces of the substrates. Particularly preferably, the tooth portions of the pair of comb-shaped electrodes are substantially parallel with each other, in other words, each of the comb-shaped electrodes has multiple substantially parallel slits.

The liquid crystal layer preferably includes liquid crystal molecules which are aligned in the orthogonal direction to the main faces of the substrates at a voltage lower than a threshold voltage. The phrase "aligned in the orthogonal direction to the main faces of the substrates" and its derivative forms herein at least satisfy the state regarded as being aligned in the orthogonal direction to the main faces in the technical field, including a mode of alignment in the substantially vertical direction. The liquid crystal molecules in the liquid crystal layer preferably substantially consist of liquid crystal molecules aligned in the orthogonal direction to the main faces of the substrates at a voltage less than a threshold voltage. Such a vertical alignment liquid crystal display panel is advantageous to provide characteristics such as a wide viewing angle and a high contrast, and its application range is widened.

The pair of comb-shaped electrodes preferably has different electric potentials at a threshold voltage or higher. The threshold voltage means a voltage value that provides a transmittance of 5% with the transmittance in the bright state defined as 100%, for example. The phrase "have different electric potentials at a threshold voltage or higher" and its derivative forms herein at least means that a driving operation that generates different electric potentials at a threshold voltage or higher can be implemented. This makes it possible to suitably control the electric field applied to the liquid crystal layer. The upper limit of each of the different electric potentials is preferably 20 V, for example. Examples of a structure for providing different electric potentials include a structure in which one comb-shaped electrode of the pair of comb-shaped electrodes is driven by a certain TFT while the other comb-shaped electrode is driven by another TFT or the other comb-shaped electrode communicates with the electrode disposed below the other comb-shaped electrode. This structure makes it possible to provide different electric potentials. The width of each tooth portion of the pair of comb-shaped electrodes is preferably 2 μm or greater, for example. The gap (length of the space) between tooth portions is preferably 2 to 7 μm, for example.

The liquid crystal display panel is preferably arranged such that the liquid crystal molecules in the liquid crystal layer are aligned in the orthogonal direction to the main faces of the substrates by an electric field generated between the pair of comb-shaped electrodes or between the first substrate and the second substrate. The electrode disposed on the first substrate is preferably a planar electrode. The term "planar electrode" herein includes a mode in which multiple electrode portions of multiple pixels are electrically connected. Preferable examples of such a mode of the planar electrode of the first substrate include a mode in which electrode portions of all the pixels are electrically connected and a mode in which electrode portions in each pixel line are electrically connected. This makes it possible to suitably apply a vertical electric field to provide a high response speed. In particular, the electrode of the first substrate which is a planar electrode makes it possible to suitably generate a vertical electric field by a potential difference between the substrates in falling, thereby providing a high response speed. The electrode of the first substrate is usually disposed on the liquid crystal layer side of the glass substrate. Still, it may be disposed on the side opposite to the liquid crystal layer of the glass substrate (viewer side).

For suitable application of a transverse electric field and a vertical electric field, particularly preferably, the electrodes (upper electrodes) at the liquid crystal layer side of the second substrate constitute a pair of comb-shaped electrodes and the electrode (lower electrode) opposite to the liquid crystal layer side of the second substrate is a slit-formed electrode. For example, the slit-formed electrode may be disposed on the layer (the layer in the second substrate opposite to the liquid crystal layer) below the pair of comb-shaped electrodes of the second substrate with an insulating layer interposed therebetween. The slit-formed electrodes on the second substrate are preferably electrically connected in each pixel line, or may be divided in each pixel unit. In the case where the comb-shaped electrodes are communicated with the slit-formed electrodes and the slit-formed electrodes are electrically connected in each pixel line, the comb-shaped electrodes communicated with the slit-formed electrodes are also electrically connected in each pixel line. This mode is also one preferable mode of the present invention. The phrase "electrically connected in each pixel line" and its derivative forms herein at least means that electrodes over multiple pixels are electrically connected along the vertical or transverse pixel line. The electrodes are not necessarily electrically connected in all the pixel lines, and are at least electrically connected in substantially each pixel line.

A mode in which the slit-formed electrodes are electrically connected in a pixel line is more preferred. In the case where the second substrate is an active matrix substrate, the term "pixel line" herein means an array of pixels aligned along the gate bus line in the active matrix substrate in a plan view of the main faces of the substrates. As mentioned above, electric connection of electrode portions of a planar electrode of the first substrate and/or slit-formed electrodes of the second substrate in a pixel line enables application of a voltage to the electrodes so that the electric potential of pixels in each even-numbered gate bus lines and that in each odd-numbered gate bus lines are inverted, thereby suitably generating a vertical electric field to provide a high response speed.

The "planar electrode" of the first substrate herein at least satisfies the state regarded as having a planar shape in the technical field of the present invention, and may have an alignment-controlling structure such as a rib or a slit in a certain region or may have such an alignment-controlling structure at the center portion of a pixel in a plan view of the main faces of the substrates. Still, preferably, the planar electrode has substantially no alignment-controlling structure.

The slit-formed electrode of the second substrate may have a rib, for example, in a certain region. Still, preferably, the slit-formed electrode has substantially only a slit and the portion having no slit has a planar shape.

The liquid crystal layer is usually aligned by an electric field generated between a pair of comb-shaped electrodes or between the first substrate and the second substrate so that it contains a component horizontal to the main faces of the substrates at a threshold voltage or higher. In particular, the liquid crystal molecules preferably include those aligned in the horizontal direction. The phrase "aligned in the horizontal direction" and its derivative forms herein at least satisfy the state regarded as being aligned in the horizontal direction in the technical field of the present invention. This improves the transmittance. The liquid crystal molecules in the liquid crystal layer preferably substantially consist of liquid crystal molecules aligned in the horizontal direction to the main faces of the substrates at a threshold voltage or higher.

The liquid crystal layer preferably includes liquid crystal molecules having positive anisotropy of dielectric constant (positive liquid crystal molecules). The liquid crystal molecules having positive anisotropy of dielectric constant are aligned in a certain direction when an electric field is applied. The alignment thereof is easily controlled and such molecules provide a higher response speed. The liquid crystal layer may also preferably include liquid crystal molecules having negative anisotropy of dielectric constant (negative liquid crystal molecules). This further improves the transmittance. From the viewpoint of a high response speed, the liquid crystal molecules preferably substantially consist of liquid crystal molecules having positive anisotropy of dielectric constant. From the viewpoint of transmittance, the liquid crystal molecules preferably substantially consist of liquid crystal molecules having negative anisotropy of dielectric constant.

At least one of the first substrate and the second substrate usually has an alignment film on the liquid crystal layer side. The alignment film is preferably a vertical alignment film.

Examples of the alignment film include alignment films formed from organic material or inorganic material, and photo-alignment films formed from photoactive material. The alignment film may be an alignment film without any alignment treatment such as rubbing. Alignment films formed from organic or inorganic material and photo-alignment films each requiring no alignment treatment enable simplification of the process to reduce the cost, as well as improvement in the reliability and the yield. If an alignment film is rubbed, the rubbing may cause disadvantages such as liquid crystal contamination due to impurities from rubbing cloth, dot defects due to contaminants, and uneven display due to uneven rubbing in each liquid crystal panel. On the contrary, the present invention can eliminate these disadvantages. At least one of the first substrate and the second substrate preferably has a polarizing plate on the side opposite to the liquid crystal layer. The polarizing plate is preferably a circularly polarizing plate. This makes it possible to further improve the transmittance. The polarizing plate may also preferably be a linearly polarizing plate. This makes it possible to give excellent viewing angle characteristics.

The liquid crystal display panel of the present invention usually generates a potential difference at least between an electrode of the first substrate and an electrode of the second substrate (e.g. the planar electrode of the first substrate and the slit-formed electrode of the second substrate) when a vertical electric field is generated. A preferable mode thereof is such that a higher potential difference is generated between the electrode of the first substrate and an electrode of the second substrate than that between electrodes (e.g. a pair of comb-shaped electrodes) of the second substrate.

When a transverse electric field is generated, a potential difference is usually generated at least between electrodes (e.g. a pair of comb-shaped electrodes) of the second substrate. For example, the device may be in a mode such that a higher potential difference is generated between electrodes of the second substrate than that between the electrode (e.g. a planar electrode) of the first substrate and an electrode (e.g. a slit-formed electrode) of the second substrate. The device may be in a mode such that a lower potential difference is generated between electrodes of the second substrate than that between the electrode of the first substrate and an electrode of the second substrate.

The commonly connected lower electrodes (slit-formed electrodes of the second substrate) corresponding to even-numbered gate-bus lines and the commonly connected lower electrodes (slit-formed electrodes of the second substrate) corresponding to odd-numbered gate-bus lines may be formed, and the electric potential changes thereof may be inverted in response to application of a voltage to these lower electrodes.

The first substrate and the second substrate of the liquid crystal display panel of the present invention constitute a pair of substrates sandwiching the liquid crystal layer. They each may have an insulation substrate (e.g. glass, resin) as its base material, and the substrates are formed by disposing lines, electrodes, color filters, and the like on the insulation substrate.

Preferably, at least one of the pair of comb-shaped electrodes is a pixel electrode and the second substrate having the pair of comb-shaped electrodes is an active matrix substrate. The liquid crystal display panel of the present invention may be of a transmission type, a reflection type, or a transflective type.

The present invention also relates to a liquid crystal display device including the liquid crystal display panel of the present invention. Preferable modes of the liquid crystal display panel in the liquid crystal display device of the present invention are the same as the aforementioned preferable modes of the liquid crystal display panel of the present invention. Examples of the liquid crystal display device include displays of personal computers, televisions, onboard devices such as automotive navigation systems, and personal digital assistants such as mobile phones. Particularly preferably, the liquid crystal display device is applied to devices used at low-temperature conditions, such as onboard devices including automotive navigation systems.

The configurations of the liquid crystal display panel and the liquid crystal display device of the present invention are not especially limited by other components as long as they essentially include such components, and other configurations usually used in liquid crystal display panels and liquid crystal display devices may appropriately be applied.

The aforementioned modes may be employed in appropriate combination as long as the combination is not beyond the spirit of the present invention.

Advantageous Effects of Invention

With respect to the liquid crystal display panel and the liquid crystal display device of the present invention, the first substrate and the second substrate include electrodes, and the electrodes of the second substrate includes a pair of comb-shaped electrodes and a slit-formed electrode. Thus, the present invention provides a sufficiently high response speed and a sufficiently excellent transmittance.

DESCRIPTION OF EMBODIMENTS

Figure 1:
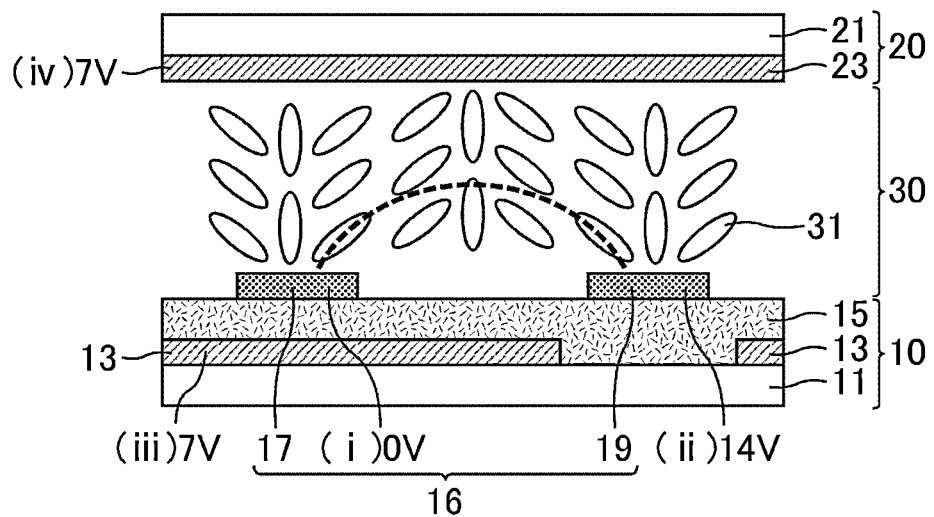
FIG. 1 is a schematic cross-sectional view showing a liquid crystal display panel of Embodiment 1 in the presence of a transverse electric field.

The present invention will be described in detail below in view of the following embodiments and drawings.

The present invention is not limited to these embodiments. The term "pixel" herein also means a subpixel unless otherwise specified. The planar electrode may have, for example, dot-patterned ribs and/or slits as long as it is a planar electrode as defined in the technical field of the present invention. Still, it preferably has substantially no alignment-controlling structure. With respect to the pair of substrates sandwiching the liquid crystal layer, the substrate on the display side is also referred to as an upper substrate and the substrate on the side opposite to the display side is also referred to as a lower substrate. With respect to the electrodes disposed on the substrates, the electrodes on the display side are also referred to as upper electrodes and the electrodes on the side opposite to the display side are also referred to as lower electrodes. The circuit substrate (second substrate) of the present embodiment is also referred to as a TFT substrate or an array substrate because it includes a thin film transistor element (TFT). In the present embodiment, the TFT is turned into the ON state and thereby a voltage is applied to at least one electrode (pixel electrode) of the pair of comb-shaped electrodes in both the rising (e.g. application of transverse electric field) and the falling (e.g. application of vertical electric field).

In each embodiment, the components or parts having the same function are given the same reference number. In the drawings, the symbol (i) indicates the electric potential of one electrode of the comb-shaped electrodes on the upper layer of the lower substrate; the symbol (ii) indicates the electric potential of the other electrode of the comb-shaped electrodes on the upper layer of the lower substrate; the symbol (iii) indicates the electric potential of the lower electrode; and the symbol (iv) indicates the electric potential of the electrode of the planar electrode on the upper substrate. The symbol (v) in Embodiment 4 indicates the electric potential of the other lower electrode. In FIG. 4, FIG. 5, FIG. 12 to FIG. 15, FIG. 18, FIG. 19, FIG. 22, FIG. 23, FIG. 28, and FIG. 29, an equipotential line is shown with the solid line indicating the transmittance distribution. FIG. 8, FIG. 10, FIG. 11, FIG. 17, and FIG. 21 each show a dual axis graph having two vertical axes, and the dot circles and arrows each indicate the correspondence between the respective charts and the vertical axes.

In the embodiments to be mentioned later, among the pair of comb-shaped electrodes and the slit-formed electrode disposed on the lower substrate, the pair of comb-shaped electrodes is used as an upper electrode and the slit-formed electrode is used as a lower electrode. This is one preferable mode. The effects of the present invention can also be provided even though the pair of comb-shaped electrodes is used as a lower electrode and the slit-formed electrode is used as an upper electrode.

Embodiment 1 (a Mode in which the Lower Electrode is Disposed Just below the Comb-shaped Electrode)

Figure 2:
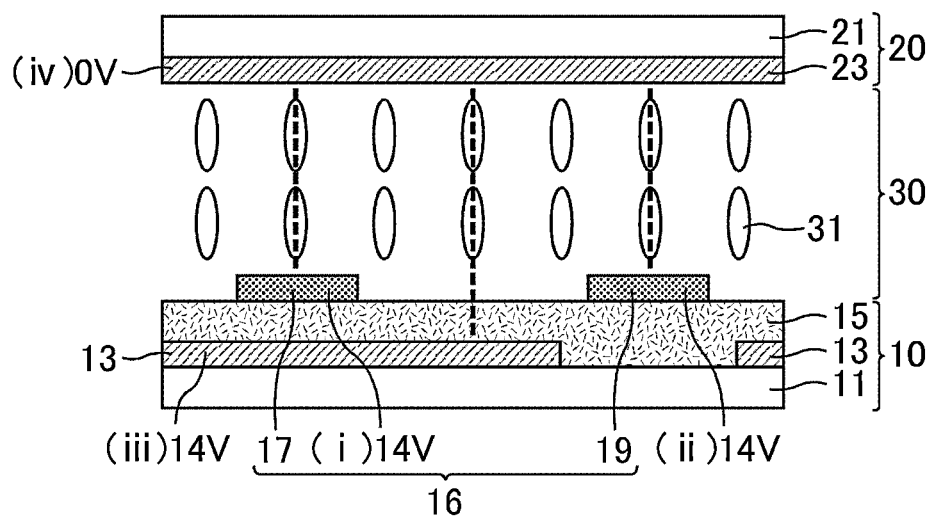
FIG. 2 is a schematic cross-sectional view showing the liquid crystal display panel of Embodiment 1 in the presence of a vertical electric field.

FIG. 1 is a schematic cross-sectional view showing a liquid crystal display panel of Embodiment 1 in the presence of a transverse electric field. FIG. 2 is a schematic cross-sectional view showing the liquid crystal display panel of Embodiment 1 in the presence of a vertical electric field. Embodiment 1 uses a mode in which the lower electrode 13 is disposed just below the comb-shaped electrode 17. In each of FIG. 1 and FIG. 2, the dot line indicates the direction of an electric field generated. The liquid crystal display panel of Embodiment 1 has a vertical-alignment three-layered electrode structure (upper electrodes of the lower substrate, which serves as the second layer, are a pair of comb-shaped electrodes) using liquid crystal molecules 31 which are positive liquid crystal. Embodiment 1 drives the lower electrode 13 separately from the comb-shaped electrode 17, and separately from the comb-shaped electrode 19. In rising, as shown in FIG. 1, a transverse electric field generated by a potential difference of 14 V between a pair of comb-shaped electrodes 16 (for example, a comb-shaped electrode 17 at an electric potential of 0 V and a comb-shaped electrode 19 at an electric potential of 14 V) rotates the liquid crystal molecules. In this case, substantially no potential difference is generated between the substrates (between a lower electrode 13 at an electric potential of 7 V and a counter electrode 23 at an electric potential of 7 V).

In falling, as shown in FIG. 2, a vertical electric field generated by a potential difference of 14 V between the substrates (for example, between each of the lower electrode 13, the comb-shaped electrode 17, and the comb-shaped electrode 19 at an electric potential of 14 V and the counter electrode 23 at an electric potential of 0 V) rotates the liquid crystal molecules. In this case, substantially no potential difference is generated between the pair of comb-shaped electrodes 16 (for example, consisting of the comb-shaped electrode 17 at an electric potential of 14 V and the comb-shaped electrode 19 at an electric potential of 14 V). In FIG. 2, the counter electrode 23 is set to 0 V. The counter electrode may be set to 0 V as shown therein, and the counter electrode is continuously set to 7 V in the simulation to be mentioned later.

In both the rising and the falling, an electric field rotates the liquid crystal molecules to provide a high response speed. In other words, a wide-range transverse electric field between the pair of comb-shaped electrodes 16 leads to the ON state to give a high transmittance in the rising, whereas the vertical electric field between the substrates leads to the ON state to give a high response speed in the falling. Further, the transverse electric field by comb driving also provides a high transmittance. Embodiment 1 and the following embodiments use a positive liquid crystal as the liquid crystal. Still, a negative liquid crystal may also be used instead of the positive liquid crystal. In the case of a negative liquid crystal, a potential difference between the pair of substrates aligns the liquid crystal molecules in the horizontal direction and a potential difference between the pair of comb-shaped electrodes aligns the liquid crystal molecules in the vertical direction. This provides an excellent transmittance, and an electric field rotates the liquid crystal molecules to provide a high response speed in both the rising and the falling.

Formation of a slit on the lower electrode 13 makes it possible to provide a higher response speed and a higher transmittance. The lower electrode 13 is electrically connected as a whole such that it surrounds the slit.

Figure 3:
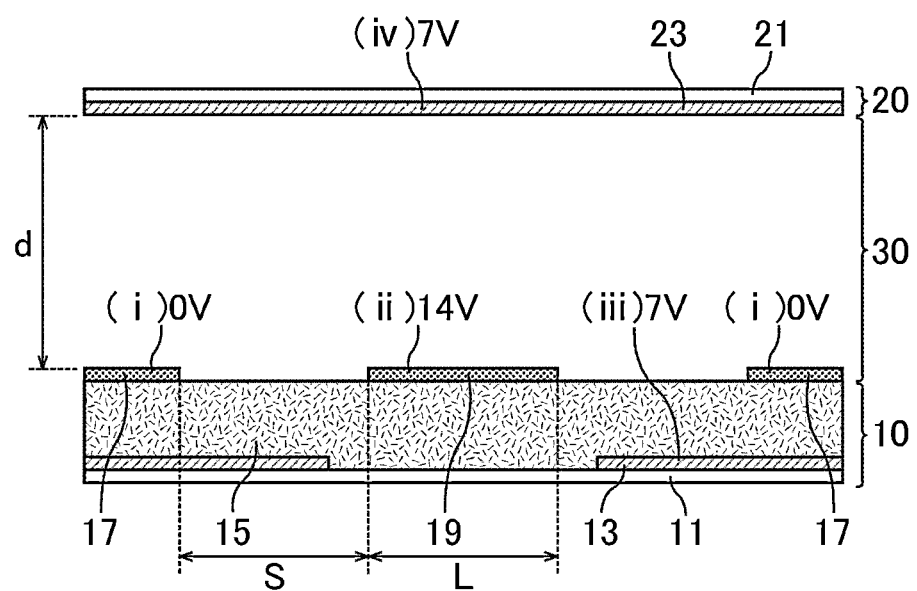
FIG. 3 is a schematic cross-sectional view showing the liquid crystal display panel of Embodiment 1 in the presence of a transverse electric field.

FIG. 3 is a schematic cross-sectional view showing the liquid crystal display panel of Embodiment 1 in the presence of a transverse electric field. FIG. 3 shows the case where the edge of the lower electrode is disposed at the center of the space between the pair of comb-shaped electrodes in a plan view of the main surfaces of the substrates.

Embodiment 1 provides an excellent transmittance in rising while providing good OFF-state characteristics. Optimization of the placement of the slit on the lower electrode (e.g. L/S value, position of electrodes) and the conditions of applying a voltage to the electrodes makes it possible not only to improve the transmittance but also to increase the response speed in the ON state without deterioration of the response in the OFF state.

The following will describe Embodiment 1 in detail.

The liquid crystal display panel of Embodiment 1 has a three-layered electrode structure that controls the alignment of the liquid crystal molecules by an electric field in both the rising and the falling, which characteristically improves the transmittance and the response by providing a slit structure for the lower electrode.

The simulation is performed under the following conditions: cell thickness of 3.6 μm; L/S of 2.6 μm/3.0 μm where L means the length of the width of the upper electrode (comb-shaped electrode) and S means the width of the gap between tooth portions of the pair of comb-shaped electrodes; and the thickness of the dielectric layer (the insulating layer between the comb-shaped electrode and the lower electrode) of 0.3 μm (∈=6.9). The counter voltage is continuously set to 7 V. The comb-shaped electrode (upper electrode) (i) is set to 0 V in the ON state and 14 V in the OFF state. The comb-shaped electrode (upper electrode) (ii) is set to 14 V in both the ON and OFF states.

The voltage applied to the lower electrode (iii) is different in each of Embodiments 1 to 4. The calculation in Embodiment 1 is performed with the lower electrode (iii) set to 7 V in the ON state and 14 V in the OFF state.

Figure 4:
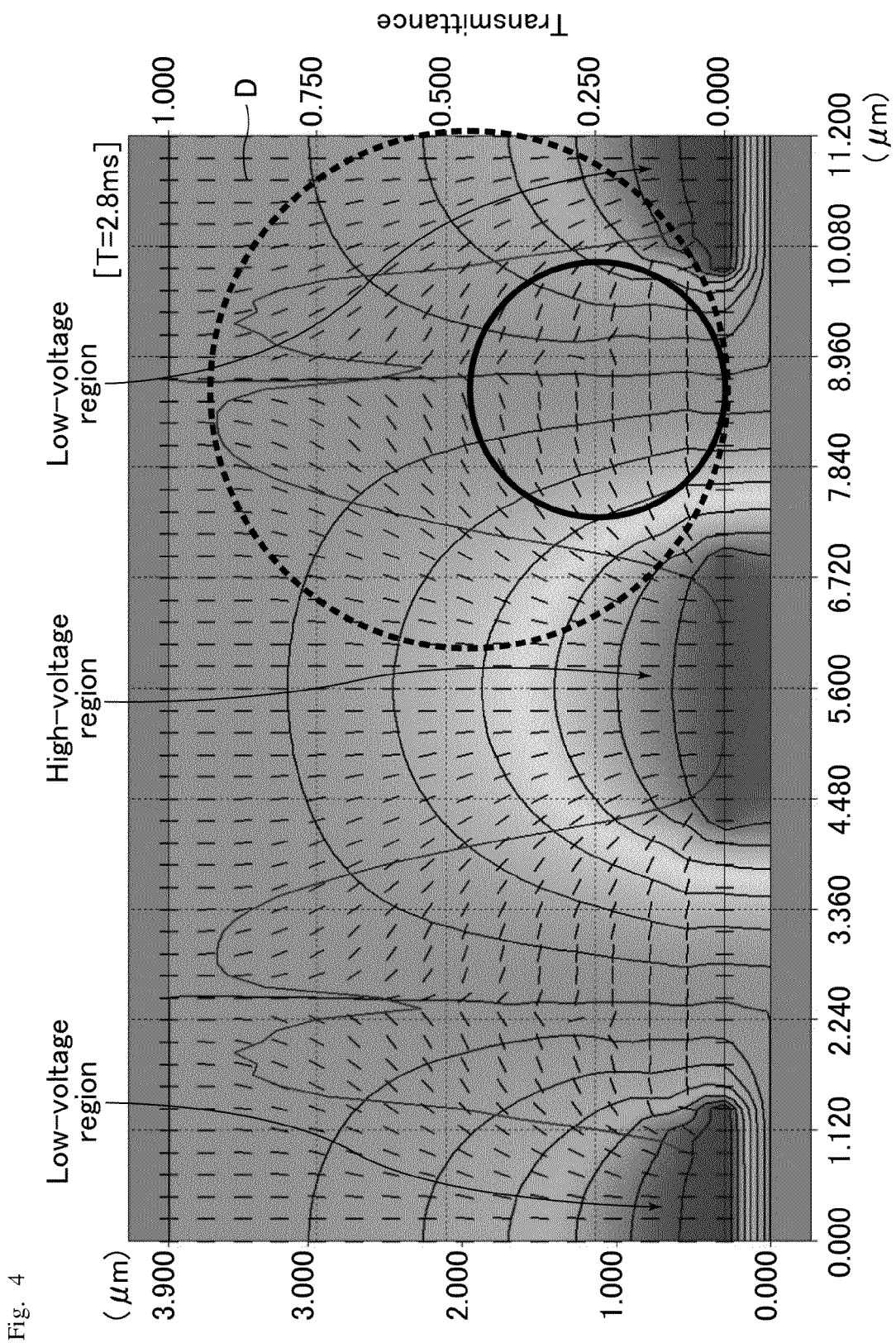
FIG. 4 shows simulation results relating to the liquid crystal display panel of Embodiment 1 in the presence of a transverse electric field.
Figure 5:
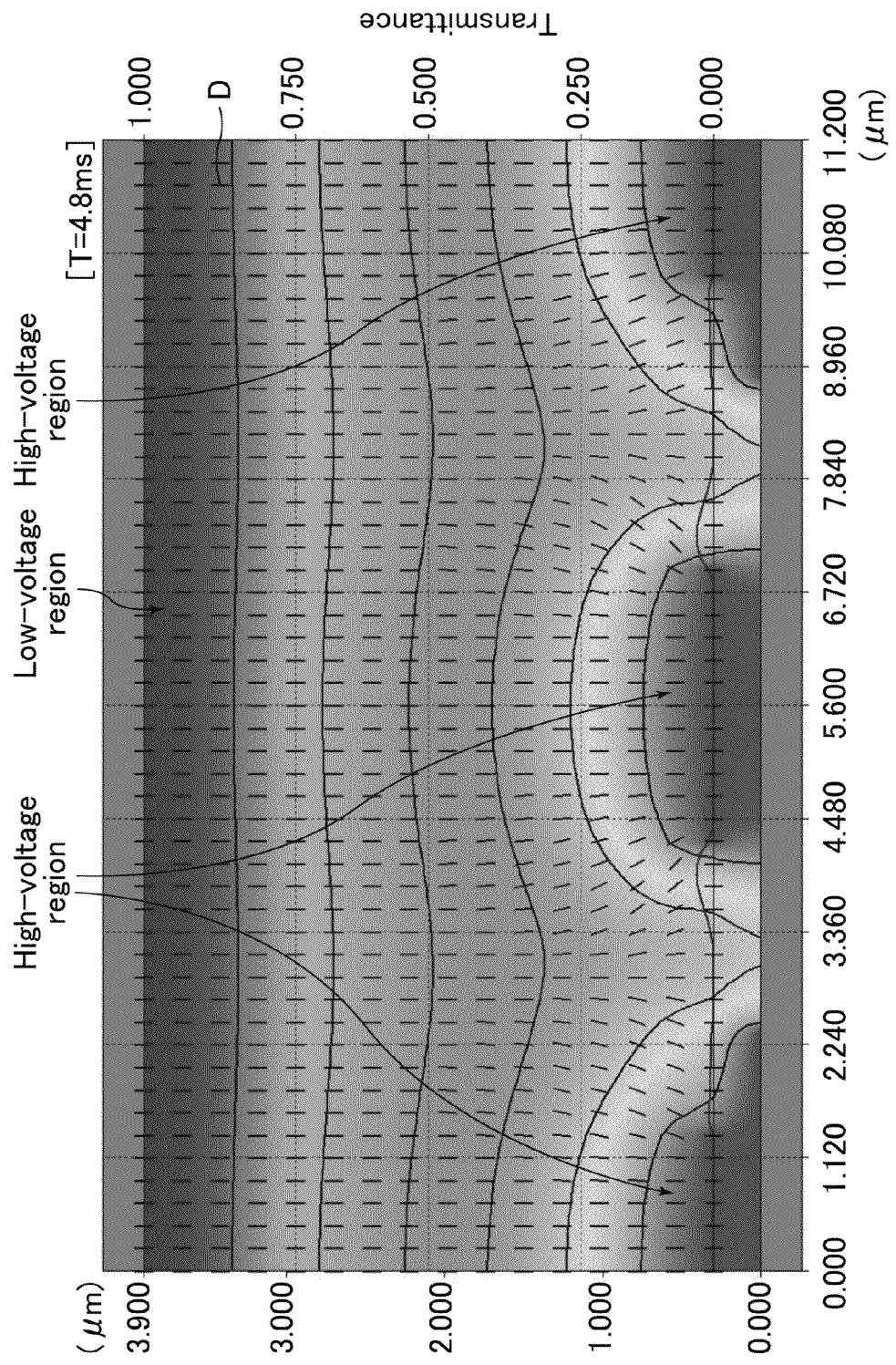
FIG. 5 shows simulation results relating to the liquid crystal display panel of Embodiment 1 in the presence of a vertical electric field.

FIG. 4 shows the simulation results relating to the liquid crystal display panel of Embodiment 1 in the presence of a transverse electric field. Formation of a slit on the lower electrode makes it possible to decrease the components shielding the transverse electric field in the ON state to improve the transmittance in comparison with Comparative Example 2 (FIG. 28) with no slit disposed on the lower electrode (for example, the transverse electric field at the portion defined by a solid line in FIG. 4 is less shielded than that at the portion defined by a solid line in FIG. 28). FIG. 4 shows the liquid crystal display panel 2.0 msec after (T=2.8 msec) the state turned into the ON state. FIG. 5 shows the simulation results relating to the liquid crystal display panel of Embodiment 1 in the presence of a vertical electric field. FIG. 5 shows the liquid crystal display panel 1.5 msec after the state turned into the OFF state (T=4.8 msec). FIG. 4 and FIG. 5 each show the director D, the electric field, and the transmittance distribution (solid line) with a cell thickness of 3.6 μm and a comb gap of 3.0 μm. The symbol T (msec) represents a value on the transverse axis (time axis) of the graph shown in FIG. 8 to be mentioned later.

Formation of a slit on the lower electrode sufficiently prevents dropping of the transmittance due to strong pull down of the line of electric force in the ON state, which occurs in the case where the lower electrode is a planar electrode without a slit as in Comparative Example 2 (FIG. 27 and FIG. 28) to be mentioned later (see the portions defined by the solid lines in FIG. 4 relating to Embodiment 1 and FIG. 28 relating to Comparative Example 2). This improves the transmittance. In other words, formation of a slit on the lower electrode is capable of suppressing the factor shielding the transverse electric field in the ON state, thereby increasing the transmittance.

Specifically, the transmittance in rising determined by the simulation was 12.2% with a slit-free planar electrode as the lower electrode. In contrast, the transmittance determined by the simulation with the liquid crystal display panel of the present invention including a slit-formed electrode as the lower electrode was higher than the above value, 13.6%.

Figure 6:
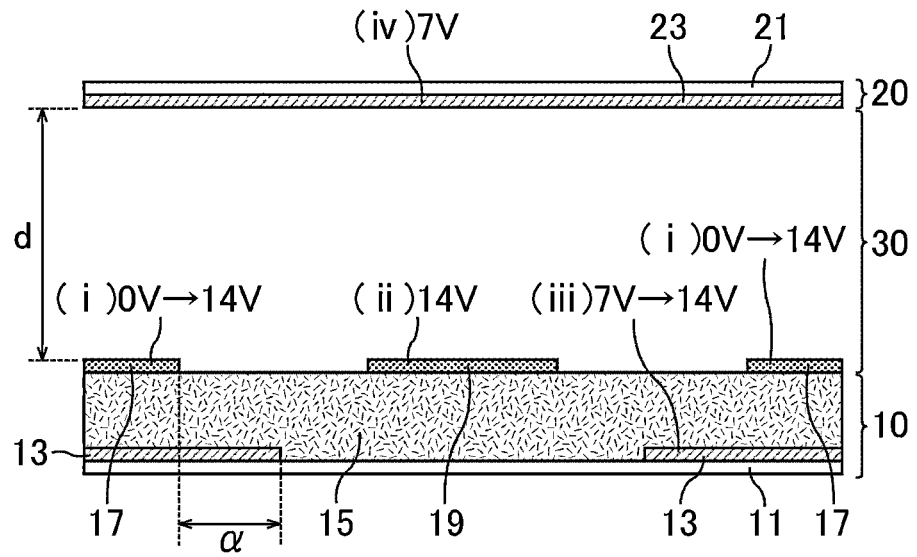
FIG. 6 is a schematic cross-sectional view showing the liquid crystal display panel of Embodiment 1.

FIG. 6 is a schematic cross-sectional view showing the liquid crystal display panel of Embodiment 1. As shown in FIG. 1 to FIG. 3 and FIG. 6, the liquid crystal display panel of Embodiment 1 characteristically has a slit-formed lower electrode disposed below one comb-shaped electrode (i). In other words, the slit-formed electrode overlaps substantially the whole of the one of the pair of comb-shaped electrodes in a plan view of the main surfaces of the substrates. In the liquid crystal display panel of Embodiment 1, a slit is formed on the lower electrode in the space between the pair of comb-shaped electrodes (upper electrodes) (the edge of the lower electrode exists in the space in a plan view of the main surfaces of the substrates).

Figure 7:
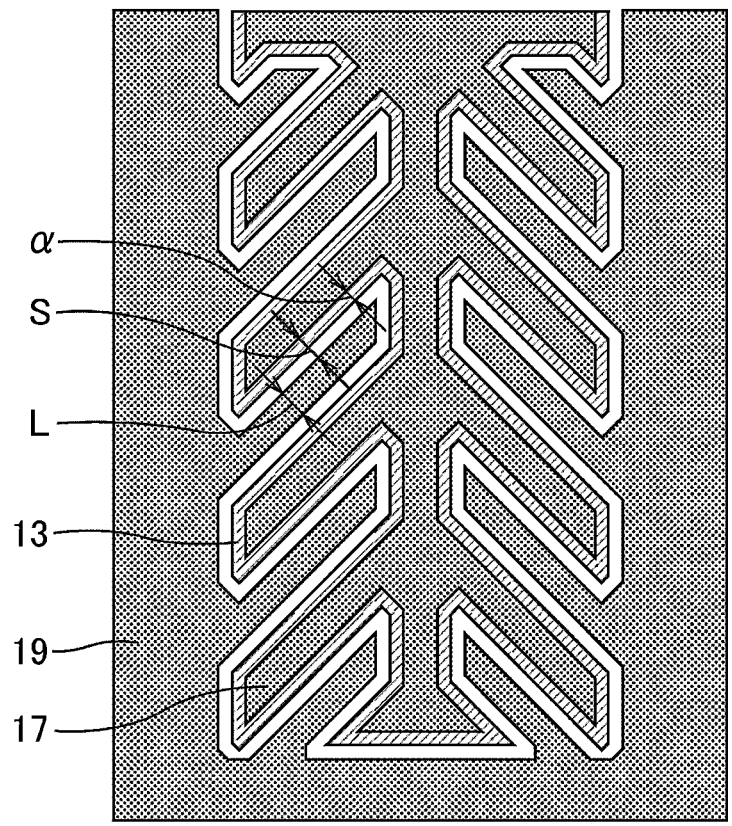
FIG. 7 is a schematic plan view showing one example of the structure of the lower electrode in the liquid crystal display panel of Embodiment 1.

FIG. 7 is a schematic plan view showing one example of the structure of the lower electrode in the liquid crystal display panel of Embodiment 1. The lower electrode 13 of Embodiment 1 is a comb-shaped electrode, and such a mode is preferred. Still, the lower electrode which is at least a slit-formed electrode is capable of providing the effects of the present invention. The lower electrode 13 of Embodiment 1 is disposed so as to overlap the whole of the comb-shaped electrode 17 in a plan view of the main surfaces of the substrates. Substantially the whole of the edge of the lower electrode 13 is apart from the comb-shaped electrode 17 by a distance of α (0.5 μm or greater but 0.7 S μm or smaller) in a plan view of the main surfaces of the substrates. The placement of the lower electrode 13 and the comb-shaped electrode 17 is preferably in such a mode. Still, the placement at least satisfies that at least part of the edge of the lower electrode 13 is apart from the comb-shaped electrode 17 by the distance a in a plan view of the main surfaces of the substrates. For example, the following is one preferable mode; that is, a tooth portion at the edge of the lower electrode 13 is along the comb-shaped electrode 17, and the portion is apart from the comb-shaped electrode 17 by the distance α. Also in Embodiment 2 to be mentioned later, a preferable mode thereof is the aforementioned one except for the range of the distance α. Embodiment 3 to be mentioned later can have the same structure as in the present embodiment except that, for example, a tooth portion of the lower electrode is disposed between the comb-shaped electrode 17 and the comb-shaped electrode 19. Embodiment 4 to be mentioned later can have the same structure as the present embodiment except that, for example, the lower electrode 13 is a pair of comb-shaped electrodes (in addition to FIG. 7, another comb-shaped electrode is added which overlaps the whole of the comb-shaped electrode 19).

Figure 8:
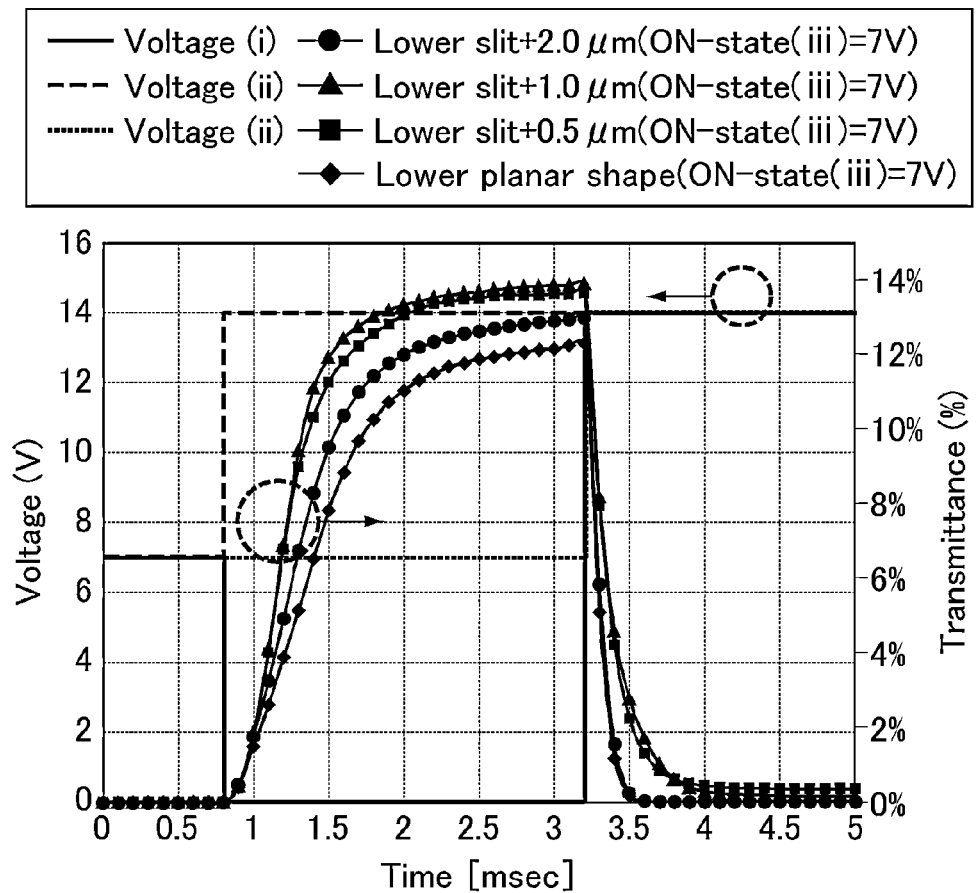
FIG. 8 is a graph showing the transmittance (%) and the voltage (V) versus the time (msec) in each mode of the liquid crystal display panel of Embodiment 1 and in a mode of a liquid crystal display panel of Comparative Example 2.

FIG. 8 is a graph showing the transmittance (%) and the voltage (V) versus the time (msec) in each mode of the liquid crystal display panel of Embodiment 1 and a mode of the liquid crystal display panel of Comparative Example 2. With the lower electrode having a planar shape without a slit, the transverse electric field (which is generated by the pair of comb-shaped electrodes (i) and (ii)) in the ON state is vertically pulled down by the lower electrode (iii) to decrease the transmittance (Comparative Example 2). However, the present embodiment suppresses such a factor, thereby improving the transmittance in rising.

In comparison with the lower electrode having a planar shape without a slit as shown in FIG. 8, the lower electrode with a slit is capable of improving the transmittance while maintaining the OFF-state characteristics. The term "OFF-state characteristics" herein means a sufficient increase in response speed in the OFF state and a sufficient decrease in transmittance in the OFF state.

The simulations are calculated under the conditions such that the slit-formed lower electrode (iii) is disposed just below one comb-shaped electrode (i) and the slit-formed lower electrode (iii) protrudes from the comb-shaped electrode (i) by 0.5 μm, 1 μm, or 2 μm. Specifically, the phrase "lower slit+2.0 μm (ON-state (iii)=7 V)" in FIG. 8 means that the lower electrode (iii) protrudes from the comb-shaped electrode (i) by 2.0 μm in the liquid crystal display panel of Embodiment 1 in a plan view of the main surfaces of the substrates. Similarly, the phrase "lower slit+1.0 μm (ON-state (iii)=7 V)" and the phrase "lower slit+0.5 μm (ON-state (iii)=7 V)" each mean that the lower electrode (iii) protrudes from the comb-shaped electrode (i) by 1.0 μm and 0.5 μm, respectively, in the liquid crystal display panel of Embodiment 1 in a plan view of the main surfaces of the substrates. The term "lower planar shape" herein means that the lower electrode has a planar shape without a slit, and indicates the case of Comparative Example 2. The width S of the slit is 3.0 μm as mentioned above.

In the above driving where the counter electrode (iv) and the lower electrode (iii) are set to 7 V in the ON state, the transmittance increases in the order regarding the protruding size of the lower electrode of +2.0 μm, +0.5 μm, and +1.0 μm (the protruding size of +1.0 μm gives the highest transmittance). In this case, the best way is to cut the lower electrode at near the center of the space between the comb-shaped electrodes, in other words, the best way is that the slit-formed electrode protrudes from one of the pair of comb-shaped electrodes in the space width direction by 70 percent or lower of the space width between the pair of comb-shaped electrodes in a plan view of the main surfaces of the substrates (the transmittance is the maximum when the edge of the lower electrode is placed at near the center of the slit). For example, a preferable mode is such that the lower electrode (iii) protrudes from one comb-shaped electrode (i) by 0.5 μm or greater but 0.7 S μm or smaller in a plan view of the main surfaces of the substrates, where S (μm) represents the width of the gap between tooth portions of the pair of comb-shaped electrodes. In other words, a preferable mode is such that the edge of the lower electrode (iii) protrudes from the comb-shaped electrode (i) by 0.5 μm or greater but 0.7 S μm or smaller in a plan view of the main surfaces of the substrates. The separated distance is a distance on a plane in a plan view of the main surfaces of the substrates (the distance shown by a double-head arrow in the transverse direction in FIG. 6). Such a mode makes it possible to markedly provide the effects of improving the OFF-state characteristics (the response speed and the transmittance (the lower, the more preferred) when the display is turned into a black display) in Embodiment 1 by increasing the size of the lower electrode to some extent and of increasing the transmittance. The above mode is particularly preferably used with, for example, the S value of 1 μm or greater. The upper limit of the S value is, for example, 10 μm.

As shown in FIG. 1 to FIG. 3 and FIG. 6, the liquid crystal display panel of Embodiment 1 includes an array substrate 10, a liquid crystal layer 30, and an opposed substrate 20 (color filter substrate) stacked in the order set forth from the back side to the viewing side of the liquid crystal display panel. As shown in FIG. 2, the liquid crystal display panel of Embodiment 1 vertically aligns the liquid crystal molecules at lower than the threshold voltage. As shown in FIG. 1, an electric field generated between the upper electrodes 17 and 19 (the pair of comb-shaped electrodes 16) disposed on the glass substrate 11 (second substrate) tilts the liquid crystal molecules in the horizontal direction between the comb-shaped electrodes when a voltage difference between the comb-shaped electrodes is not lower than the threshold voltage, thereby controlling the amount of light transmitted. The slit-formed lower electrode 13 is disposed such that it sandwiches an insulating layer 15 with the upper electrodes 17 and 19 (the pair of comb-shaped electrodes 16). The insulating layer 15 may be formed from an oxide film (e.g. $SiO_2$), a nitride film (e.g. SiN), or an acrylic resin, for example, and these materials may be used in combination.

Although not shown in FIG. 1 and FIG. 2, a polarizing plate is disposed on each substrate at the side opposite to the liquid crystal layer. The polarizing plate may be a circularly polarizing plate or may be a linearly polarizing plate. An alignment film is disposed on the liquid crystal layer side of each substrate. The alignment films each may be an organic alignment film or may be an inorganic alignment film as long as they align the liquid crystal molecules orthogonally to the film surface.

A voltage supplied from a source bus line is applied to the comb-shaped electrode 19, which drives the liquid crystal material, through a thin film transistor element (TFT) at the timing when a pixel is selected by a gate bus line. The comb-shaped electrode 17 and the comb-shaped electrode 19 are formed on the same layer in the present embodiment and are preferably in a mode where they are formed on the same layer. Still, the comb-shaped electrodes may be formed on different layers as long as a voltage difference is generated between the comb-shaped electrodes to apply a transverse electric field and provides one effect of the present invention, that is, the effect of improving the transmittance. The comb-shaped electrode 19 is connected to a drain electrode that extends from the TFT through a contact hole. The slit-formed lower electrodes 13 corresponding to the even-numbered gate bus lines may be commonly connected and the slit-formed lower electrodes 13 corresponding to the odd-numbered gate bus lines may be commonly connected. The counter electrodes 23 have a planar shape and are commonly connected for all the pixels.

In the aforementioned simulation, the electrode width L of each comb-shaped electrode is 2.6 μm, and it is preferably 2 μm or greater from the viewpoint of preventing problems in device production such as leakage and breaking of lines. The electrode gap S between the comb-shaped electrodes is 3.0 μm, and it is preferably 2 μm or greater, for example. The upper limit thereof is preferably 7 μm, for example.

The ratio (L/S) between the electrode gap S and the electrode width L is preferably 0.4 to 3, for example. The lower limit thereof is more preferably 0.5, whereas the upper limit thereof is more preferably 1.5.

The cell thickness d is 3.6 μm. The cell thickness d is preferably 2 μm to 7 μm. The cell thickness d (thickness of the liquid crystal layer) herein is preferably calculated by averaging the thicknesses throughout the liquid crystal layer in the liquid crystal display panel.

The liquid crystal display device including the liquid crystal display panel of Embodiment 1 may appropriately include the components that usual liquid crystal display devices have (e.g. light source). The same shall apply to the following Embodiments 2 to 4.

Embodiment 2 (a Mode in which a Lower Electrode is Disposed Just below One Comb-shaped Electrode, and the Electric Potential of the Lower Electrode (iii) is Equal to that of the Comb-shaped Electrode (i) or the Comb-shaped Electrode (ii))

In Embodiment 2, the electric potential of the lower electrode (iii) is set equal to that of the comb-shaped electrode (i) or (ii), in addition to the mode where the slit-formed lower electrode is disposed just below the comb-shaped electrode as in Embodiment 1.

Figure 9:
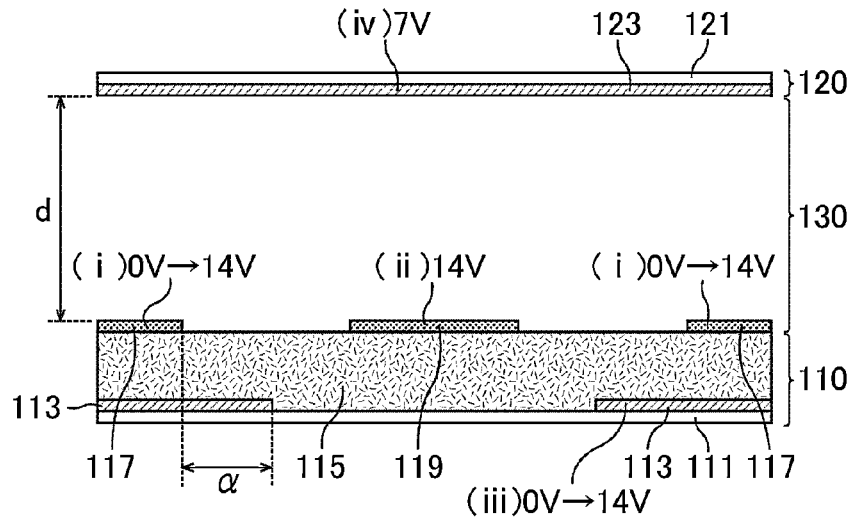
FIG. 9 is a schematic cross-sectional view showing a liquid crystal display panel of Embodiment 2.

FIG. 9 is a schematic cross-sectional view showing a liquid crystal display panel of Embodiment 2. As shown in FIG. 9, the liquid crystal display panel of Embodiment 2 is the same as the liquid crystal display panel of Embodiment 1 in the way of disposing the slit on the lower electrode but is different from that in Embodiment 1 in the conditions of applying voltages to the respective electrodes.

Figure 10:
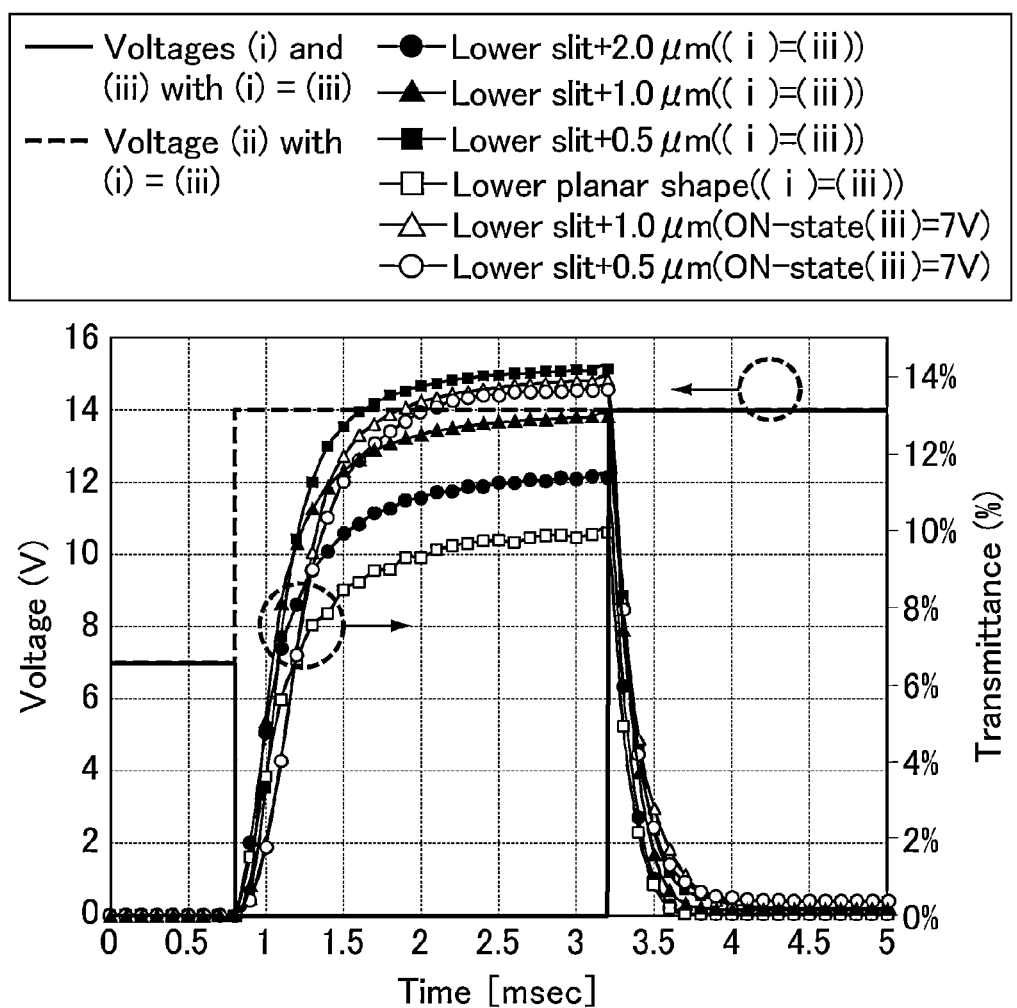
FIG. 10 is a graph showing the transmittance (%) and the voltage (V) versus the time (msec) in each mode of the liquid crystal display panel of Embodiment 1 and in each mode of the liquid crystal display panel of Embodiment 2.

FIG. 10 is a graph showing the transmittance (%) and the voltage (V) versus the time (msec) in each mode of the liquid crystal display panel of Embodiment 1 and each mode of the liquid crystal display panel of Embodiment 2. Embodiment 2 performs the calculation with the electric potential of the lower electrode set equal to that of the comb-shaped (upper) electrode. In FIG. 10, the plots of black points indicate the cases of Embodiment 2. The plots of solid-white points indicate the cases of Embodiment 1 and the case where the lower electrode has a planar shape without a slit and the electric potential of the lower electrode (iii) is equal to that of the comb-shaped electrode (i).

With a lower electrode having a planar shape without a slit, the lower electrode (iii) vertically pulls the transverse electric field (generated by the pair of comb-shaped electrodes (i) and (ii)) in the ON state down to decrease the transmittance (Comparative Example 2). In contrast, Embodiment 2 also suppresses such a factor, and thereby is capable of improving the transmittance in rising while maintaining the OFF-state characteristics.

Also in Embodiment 2, as mentioned above, the simulation is calculated with the slit-formed lower electrode (iii) disposed just below one comb-shaped electrode (i) and the slit-formed lower electrode (iii) protruding from the comb-shaped electrode (i) by 0.5 µm, 1 µm, or 2 µm. In FIG. 10, the phrase "lower slit+2.0 µm" herein means that the lower electrode (iii) protrudes from the comb-shaped electrode (i) by 2.0 µm in a plan view of the main surfaces of the substrates in the liquid crystal display panel of Embodiment 2. Similarly, the phrases "lower slit+1.0 µm" and "lower slit+0.5 µm" herein each mean that the lower electrode (iii) protrudes from the comb-shaped electrode (i) by 1.0 µm and 0.5 µm, respectively, in a plan view of the main surfaces of the substrates in the liquid crystal display panel of Embodiment 2. The phrases "lower slit+1.0 µm (ON-state (iii)=7 V)" and "lower slit+0.5 µm (ON-state (iii)=7 V)" herein mean the same cases as in FIG. 8. The term "lower planar shape" herein means that the lower electrode is a planar electrode without a slit. The term "(i)=(iii)" herein means that the electric potential of the comb-shaped electrode (i) is the same as that of the lower electrode (iii). The same shall apply to the drawings to be mentioned later. The length of the above protrusion is a length indicated by a double-headed arrow in the transverse direction in FIG. 9.

Since the electric potential of the lower electrode (iii) is set equal to that of one comb-shaped (upper) electrode (i) or (ii) in Embodiment 2, the number of driving TFTs is reduced. This makes the production easy, and the reduction in the number of TFTs leads to sufficient improvement of the aperture ratio. For example, the number of TFTs per pixel is preferably 2 or lower.

In the above driving where the electric potential of the comb-shaped electrode (i) is set equal to that of the lower electrode (iii) with the space S of 3 µm, the transmittance increases in the order regarding the protruding size of the lower electrode (iii) of +2.0 µm, +1.0 µm, and +0.5 µm (the protrusion of +0.5 µm gives the highest transmittance). For example, at least part of the edge of the slit-formed electrode is preferably apart from the pair of comb-shaped electrodes by 0 µm or greater but 0.5 S µm or smaller in a plan view of the main surfaces of the substrates, where the S (µm) represents the width of the gap between tooth portions of the pair of comb-shaped electrodes. In other words, a preferable mode is such that the lower electrode (iii) protrudes from the comb-shaped electrode (i) by 0 µm or greater but 50% or lower of the length of the space S. This makes it possible to markedly showing the effects of improving the OFF-state characteristics (response speed and transmittance (the lower, the more preferred) when the display is turned into a black display) by increasing the size of the lower electrode to some extent and of sufficiently increasing the transmittance in Embodiment 2. The preferable range of the S value is the same as that described in Embodiment 1. As in the case of the lower slit+0.5 µm in FIG. 10, some conditions provide a higher transmittance than in Embodiment 1.

Figure 11:
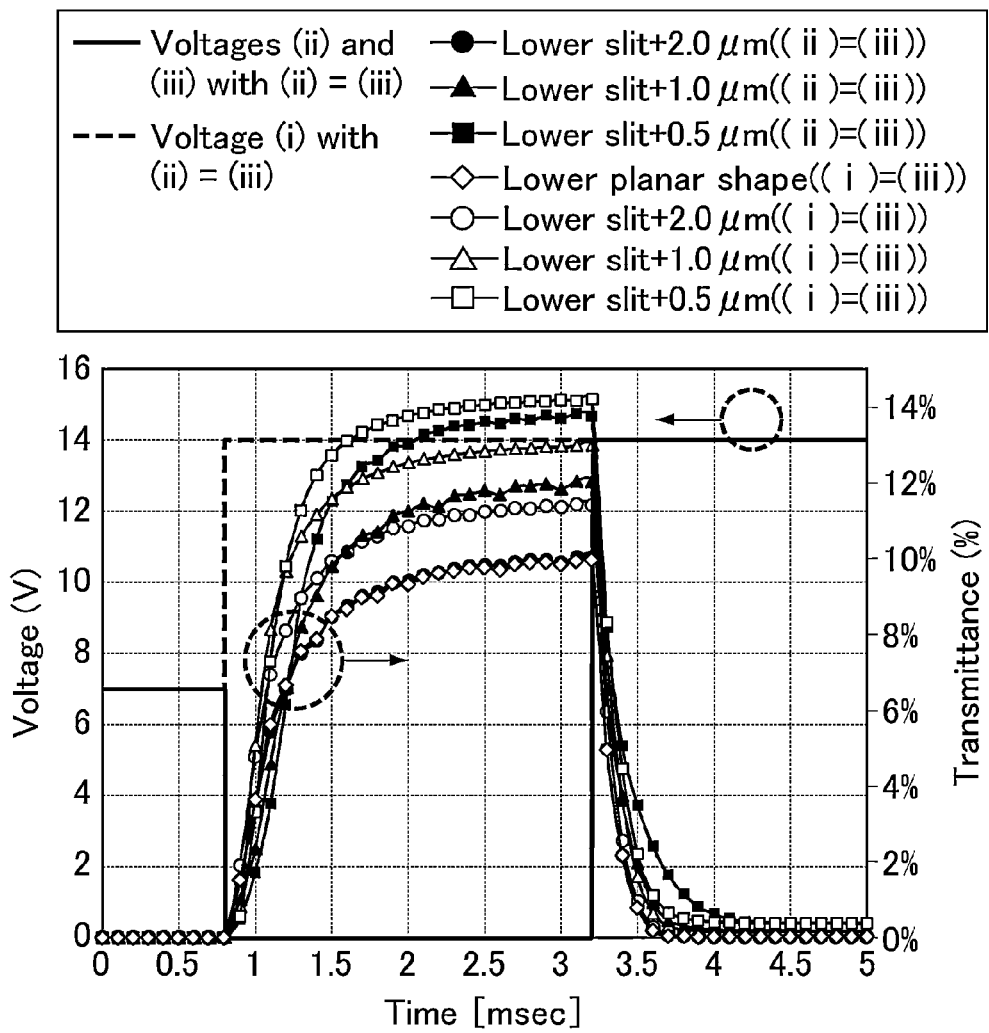
FIG. 11 is a graph showing the transmittance (%) and the voltage (V) versus the time (msec) in each mode of the liquid crystal display panel of Embodiment 2.

FIG. 11 is a graph showing the transmittance (%) and the voltage (V) versus the time (msec) in each mode of the liquid crystal display panel of Embodiment 2. In FIG. 11, the plots of black points indicate the cases where the lower electrode (iii) and the comb-shaped electrode (ii) disposed on different positions have the same electric potential. The plots of solid-white points indicate the cases where the lower electrode (iii) and the comb-shaped electrode (i) disposed on the same position have the same electric potential.

FIG. 11 shows the cases where the electric potential of the lower electrode (iii) is set equal to that of the comb-shaped electrode (i) (Embodiment 2) and the cases where the electric potential of the lower electrode (iii) is set equal to that of the comb-shaped electrode (ii) (modified examples of Embodiment 2). FIG. 11 shows that a higher transmittance and a higher response speed, that is, better results in both of the transmittance and the response are achieved in the cases where the electric potential of the lower electrode (iii) is set equal to that of the comb-shaped electrode (i) disposed on the same position, in other words, disposed so as to overlap each other in a plan view of the main surfaces of the substrates (indicated by the plots of solid-white points) than in the cases where the electric potential of the lower electrode (iii) is set equal to that of the comb-shaped electrode (ii) (indicated by the plots of black points).

In the cases where the electric potential of the lower electrode (iii) is set equal to that of the comb-shaped electrode (i), the lower electrode (iii) assists the comb-shaped electrode (i) to provide a higher response speed in the ON state.

Figure 12:
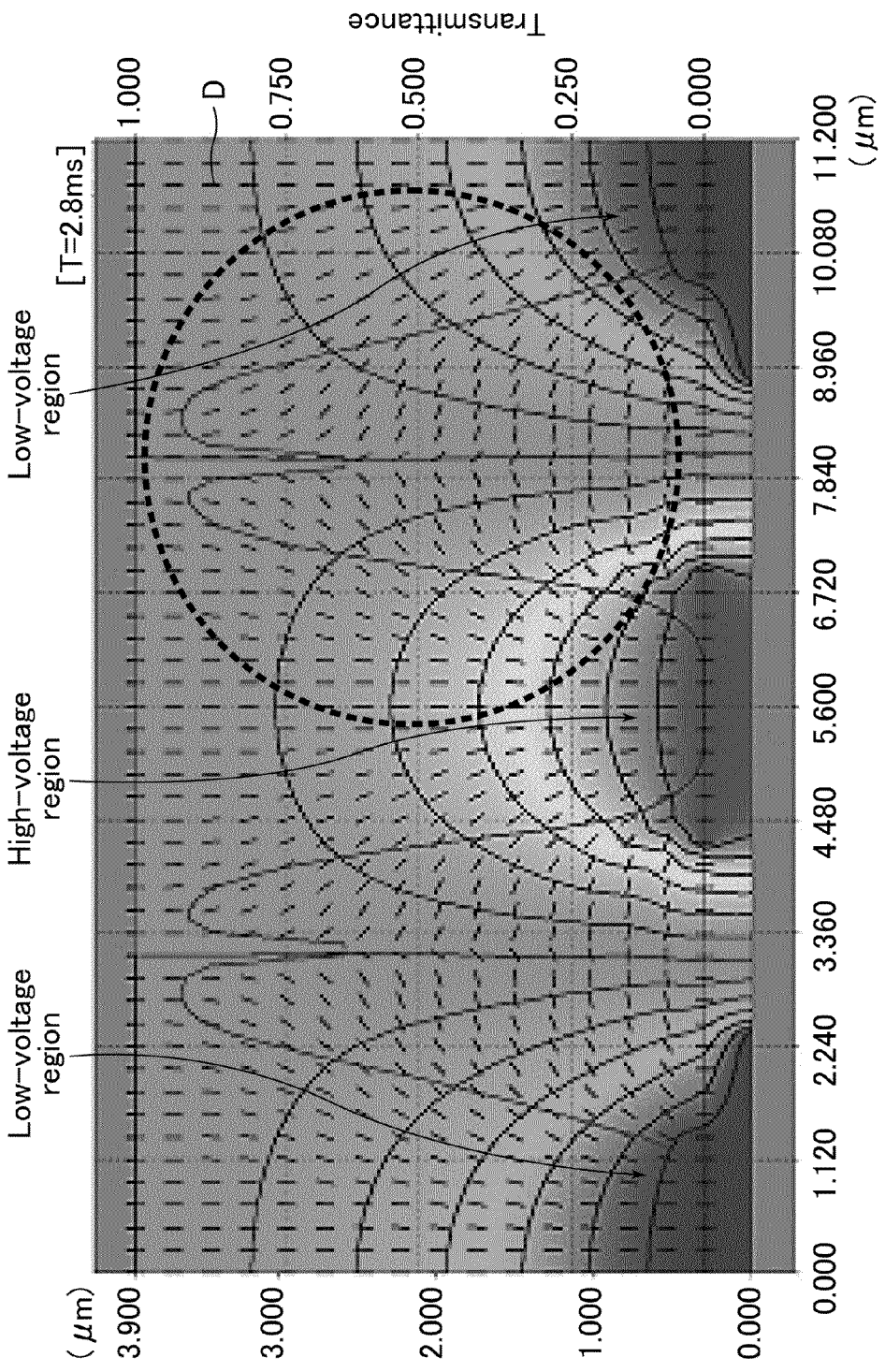
FIG. 12 shows simulation results relating to the liquid crystal display panel of Embodiment 2 in the presence of a transverse electric field.
Figure 13:
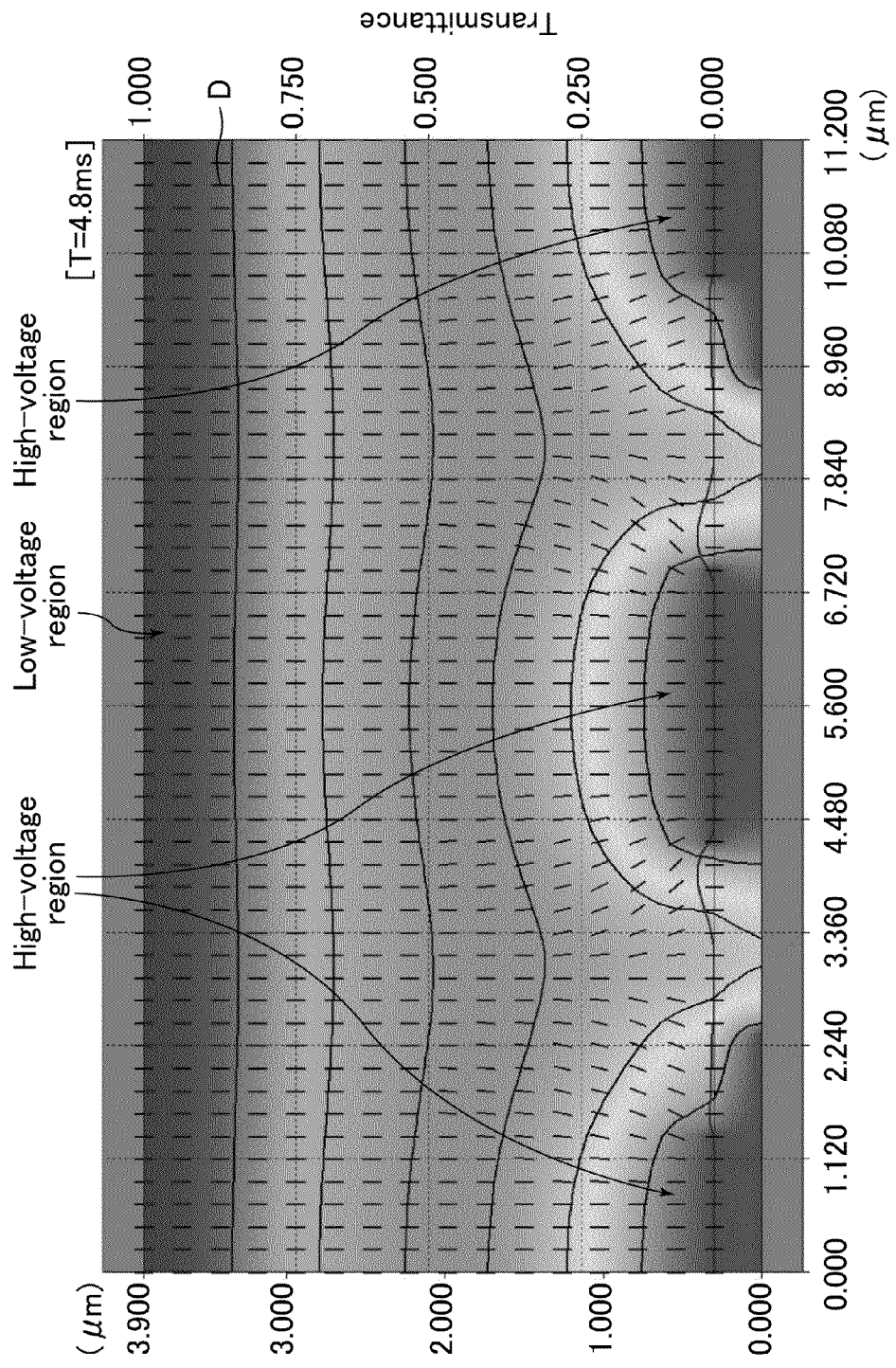
FIG. 13 shows simulation results relating to the liquid crystal display panel of Embodiment 2 in the presence of a vertical electric field.
Figure 14:
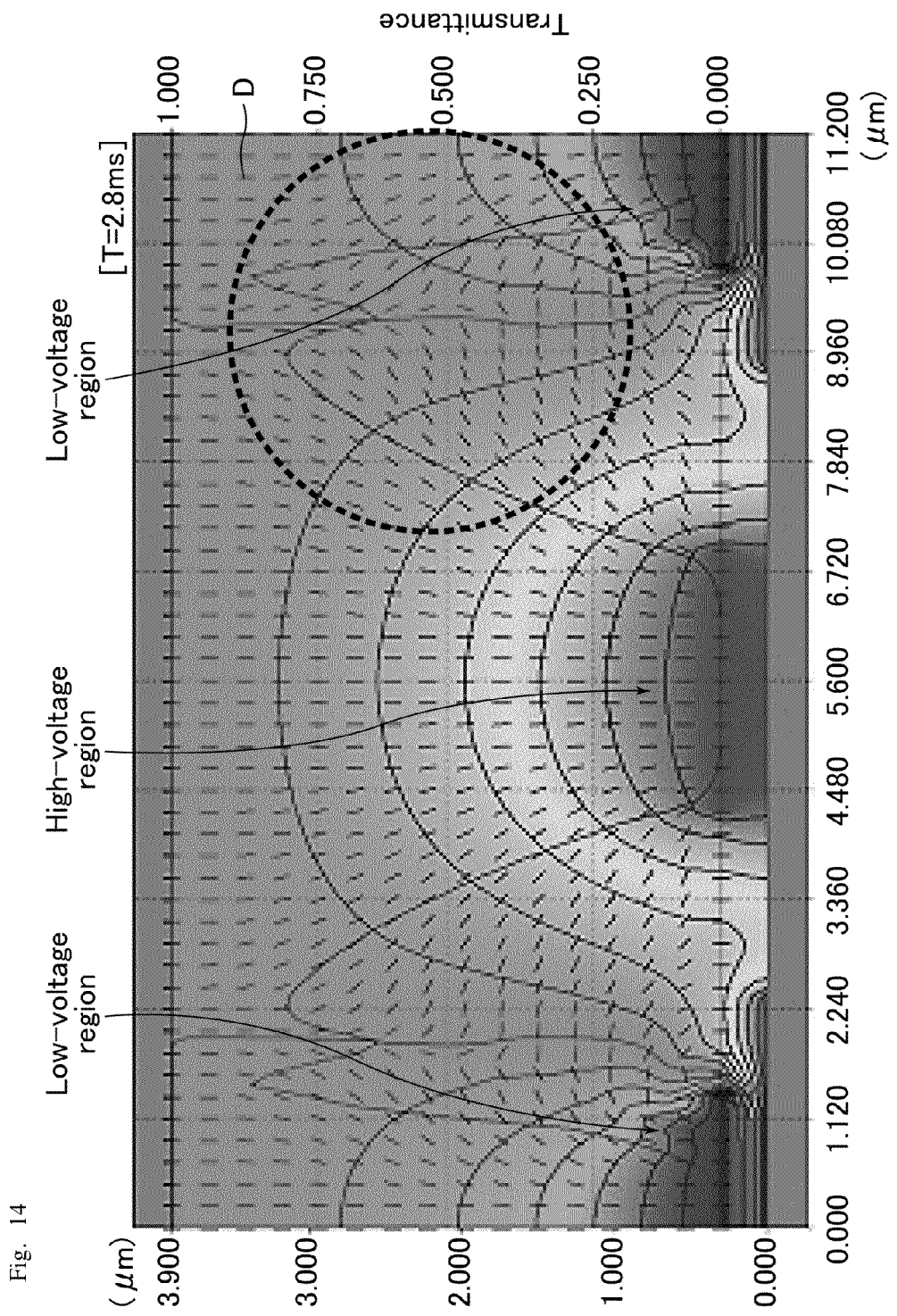
FIG. 14 shows simulation results relating to the liquid crystal display panel of one modified example of Embodiment 2 in the presence of a transverse electric field.
Figure 15:
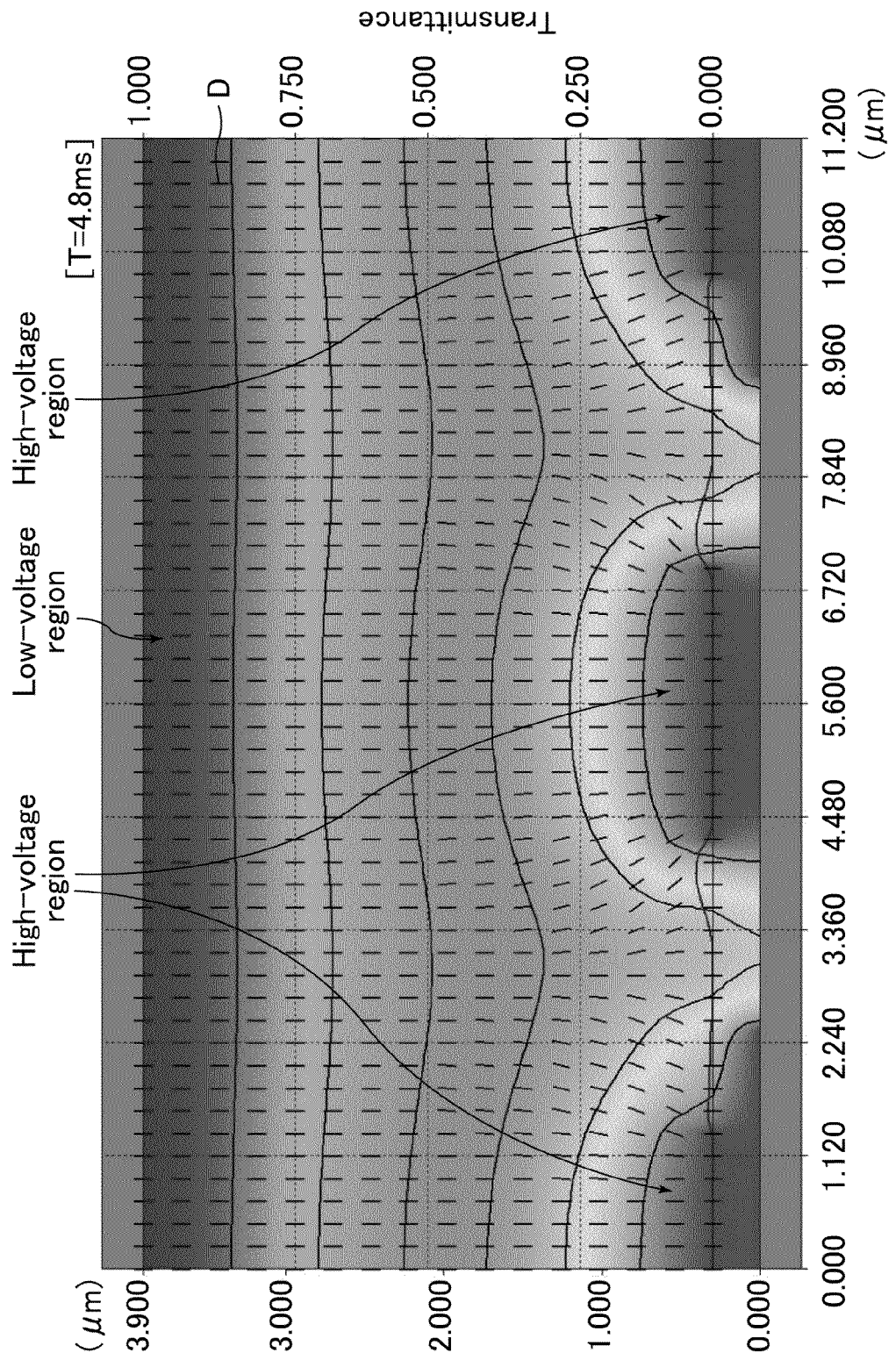
FIG. 15 shows simulation results relating to the liquid crystal display panel of one modified example of Embodiment 2 in the presence of a vertical electric field.

FIG. 12 shows simulation results relating to the liquid crystal display panel of Embodiment 2 (the electric potential of the lower electrode (iii) is equal to that of the comb-shaped electrode (i)) in the presence of a transverse electric field. FIG. 13 shows simulation results relating to the liquid crystal display panel of Embodiment 2 in the presence of a vertical electric field. FIG. 14 shows simulation results relating to the liquid crystal display panel of one modified example of Embodiment 2 (the electric potential of the lower electrode (iii) is equal to that of the comb-shaped electrode (ii)) in the presence of a transverse electric field. FIG. 15 shows simulation results relating to the liquid crystal display panel of one modified example of Embodiment 2 in the presence of a vertical electric field. FIG. 12 and FIG. 14 each indicate the liquid crystal display panel 2.0 msec after the state is turned into the ON state (T=2.8 msec). FIG. 13 and FIG. 15 each indicate the liquid crystal display panel 1.5 msec after the state is turned into the OFF state (T=4.8 msec). The symbol T (msec) in FIG. 12 to FIG. 15 indicates the value of the transverse axis (time axis) in the graphs of FIG. 10 and FIG. 11.

The comparison between the direction of the director D and the transmittance distribution shows that different conditions give different symmetry states. The symmetry in Embodiment 2 is made better than that in Embodiment 1 (see the transmittance distribution (solid line) circled by the dot line in each of FIG. 4, FIG. 12, and FIG. 14).

The transmittance and the response speed as shown in the above Embodiment 2 may presumably be provided owing to the influence of the following symmetry of the transmittance distribution. That is, the comparison of FIG. 4, FIG. 12, and FIG. 14 in the transmittance distributions (solid line) shows that the symmetry is most deteriorated in the modified example of Embodiment 2 where the electric potential of the lower electrode (iii) is set equal to that of the comb-shaped electrode (ii) (FIG. 14), whereas the transmittance distribution slightly tilts toward the lower electrode (iii) and the comb-shaped electrode (i) in Embodiment 1 (FIG. 4). In the case where the electric potential of the lower electrode (iii) is set equal to that of the comb-shaped electrode (ii) in Embodiment 2, the transmittance distribution has symmetry (FIG. 12).

The other configurations in Embodiment 2 are the same as those described in Embodiment 1. The other reference signs in the drawings relating to Embodiment 2 are the same as those in the drawings relating to Embodiment 1 except that the figure of "1" is added to the hundreds digit.

Embodiment 3 (a Mode in which a Lower Electrode is Disposed between (at the Space of) a Pair of Comb-shaped Electrodes)

Figure 16:
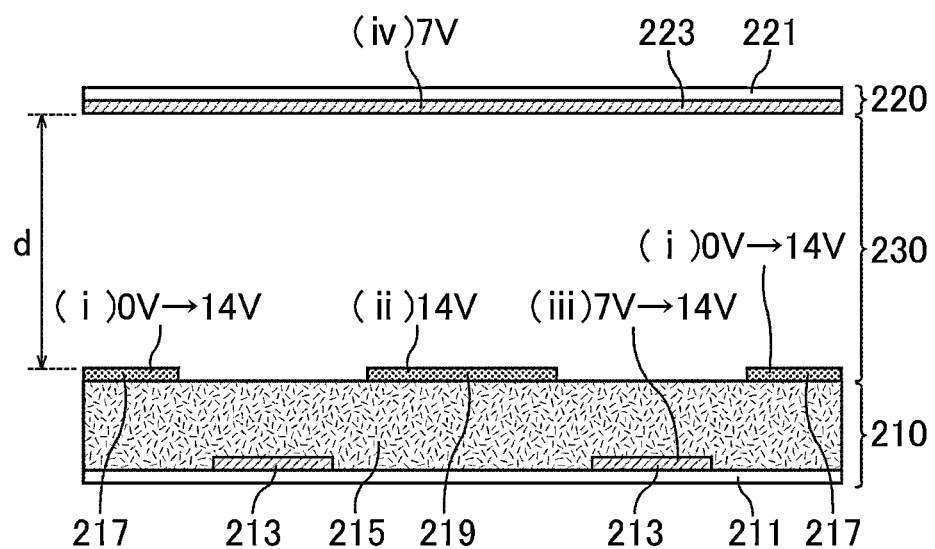
FIG. 16 is a schematic cross-sectional view showing a liquid crystal display panel of Embodiment 3.

FIG. 16 is a schematic cross-sectional view showing a liquid crystal display panel of Embodiment 3. Embodiment 3 relates to a mode in which the lower electrode (iii) is disposed between a pair of comb-shaped (upper) electrodes. The slit of the lower electrode (the portion with no lower electrode) overlaps the pair of comb-shaped electrodes in a plan view of the main surfaces of the substrates. Similar to Embodiment 1, Embodiment 3 drives the lower electrode (iii) separately from the comb-shaped electrode (i) and also separately from the comb-shaped electrode (ii). The calculation is performed with the lower electrode set to 7 V in the ON state and set to 14 V in the OFF state.

Figure 17:
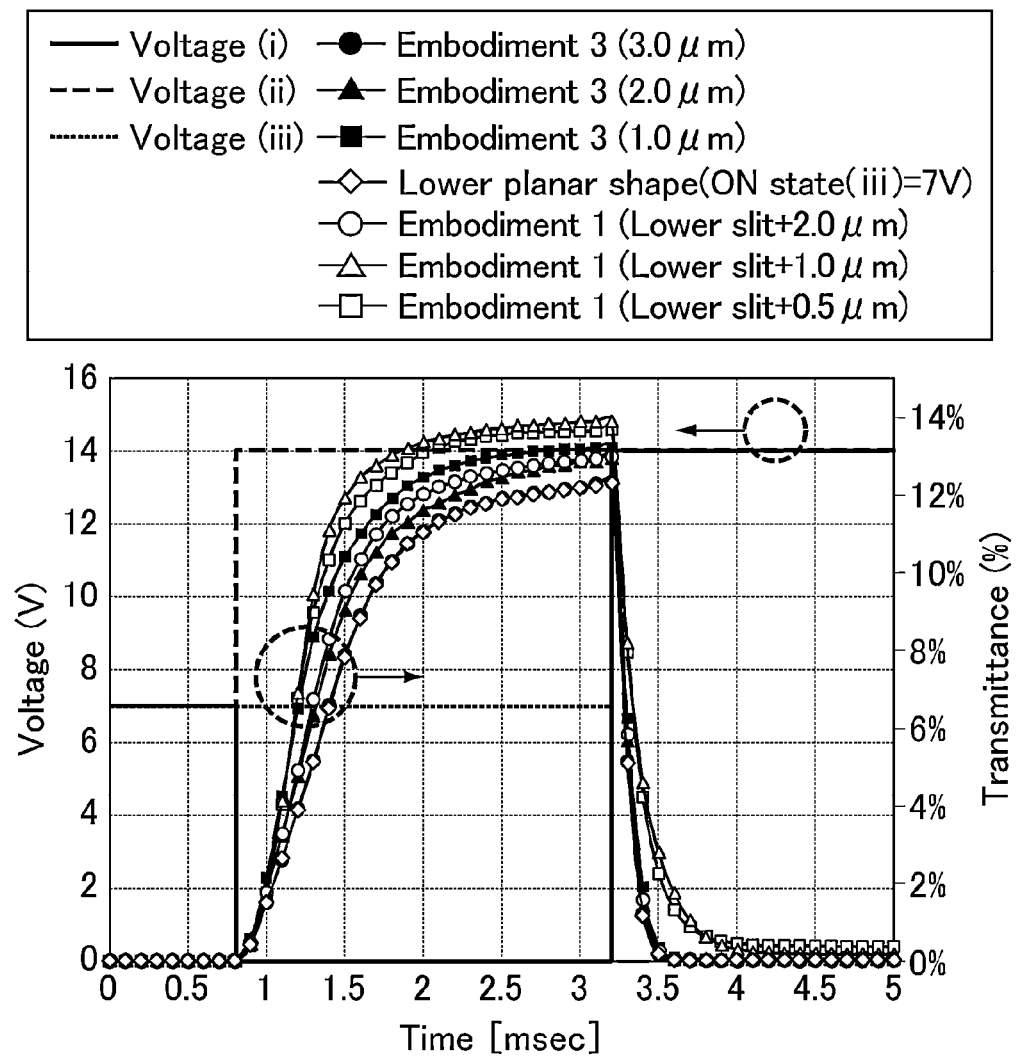
FIG. 17 is a graph showing the transmittance (%) and the voltage (V) versus the time (msec) in each mode of the liquid crystal display panel of Embodiment 1 and in each mode of the liquid crystal display panel of Embodiment 3.

FIG. 17 is a graph showing the transmittance (%) and the voltage (V) versus the time (msec) in each mode of the liquid crystal display panel of Embodiment 1 and each mode of the liquid crystal display panel of Embodiment 3. In FIG. 17, the plots of black points indicate the cases of Embodiment 3. The plots of solid-white points indicate the cases of Embodiment 1 and the case of the lower planar shape (Comparative Example 2).

As the lower electrode (iii) is set to an appropriate voltage in the ON state, the lower electrode (iii) serves to assist the transverse electric field between the comb-shaped electrode (i) and the comb-shaped electrode (ii). This sufficiently improves the transmittance in the ON state. For example, the lower electrode (iii) in the ON state is preferably set to the median of the voltage between the pair of comb-shaped electrodes.

Further, the lower electrode is disposed and driven so as to reinforce the slit (the portion with no electrode) of the comb-shaped electrodes (upper electrodes) in the OFF state. Thus, a sufficient vertical electric field is applied and markedly excellent OFF-state characteristics are provided, which is close to the case where the lower electrode is a planar electrode without a slit.

The simulation is calculated under the conditions that the slit-formed lower electrode (iii) is disposed at the center of the space between the comb-shaped electrodes (the region between the comb-shaped electrode and the comb-shaped electrode in a plan view of the main surfaces of the substrates) and the length of the electrode is set to 1 μm, 2 μm, or 3 μm. In FIG. 17, the phrase "Embodiment 3 (3.0 μm)" means that the lower electrode with an electrode length of 3 μm is disposed at the space between the comb-shaped electrode (i) and the comb-shaped electrode (iii) in a plan view of the main surfaces of the substrates, the lower electrode covering the whole of the space. Similarly, the phrases "Embodiment 3 (2.0 μm)" and "Embodiment 3 (1.0 μm)" mean that the lower electrode with an electrode length of 2 μm and the lower electrode with an electrode length of 1 μm, respectively, are disposed at the space between the comb-shaped electrode (i) and the comb-shaped electrode (iii) in a plan view of the main surfaces of the substrates. The phrases "lower slit+2.0 μm", "lower slit+1.0 μm", and "lower slit+0.5 μm" are the same as those described in FIG. 8.

In the above driving, the transmittance increases in the order regarding the length of the lower electrode (iii) of 3.0 μm, 2.0 μm, and 1.0 μm (the length of 1.0 μm gives the highest transmittance). For example, the length of the lower electrode (iii) (slit-formed electrode) is preferably 0.3 S μm or greater but 0.7 S μm or smaller from the pair of comb-shaped electrodes in a plan view of the main surfaces of the substrates, where the symbol S (μm) represents the width of the gap between tooth portions of the pair of comb-shaped electrodes. In other words, the electrode length of the lower electrode (iii) is preferably 30% or higher but 70% or lower of the length of the space S. This makes it possible to markedly show the effects of improving the OFF-state characteristics (response speed and transmittance (the lower, the more preferred) when the display is turned into a black display) by increasing the size of the lower electrode to some extent and of sufficiently increasing the transmittance in Embodiment 3. The preferable range of the value S is the same as that described in Embodiment 1. The phrase "length of the electrode" in Embodiment 3 usually means the length not in the longitudinal direction but in the lateral direction of the electrode (the length of the width of the electrode).

Figure 18:
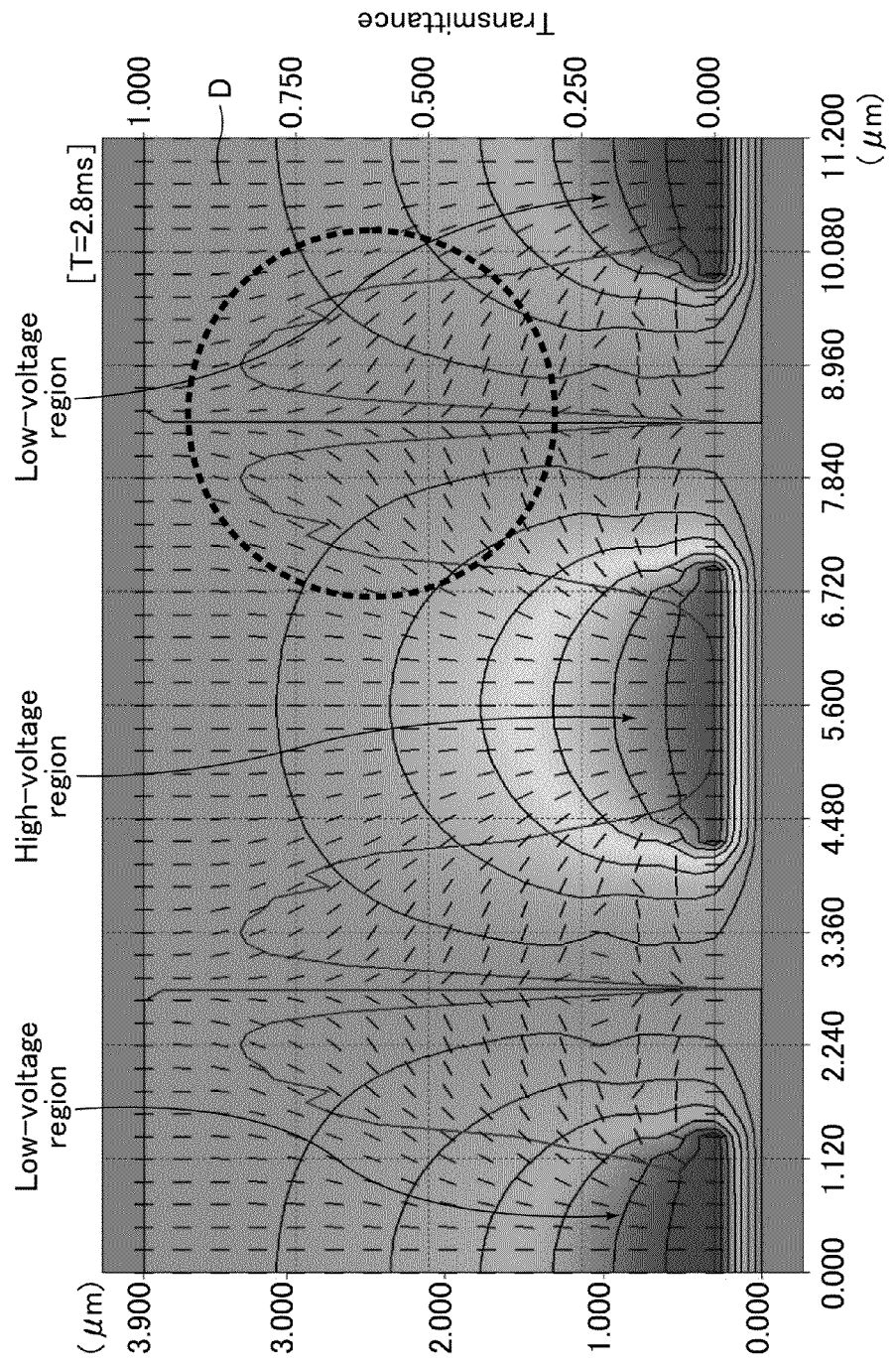
FIG. 18 shows simulation results relating to the liquid crystal display panel of Embodiment 3 in the presence of a transverse electric field.
Figure 19:
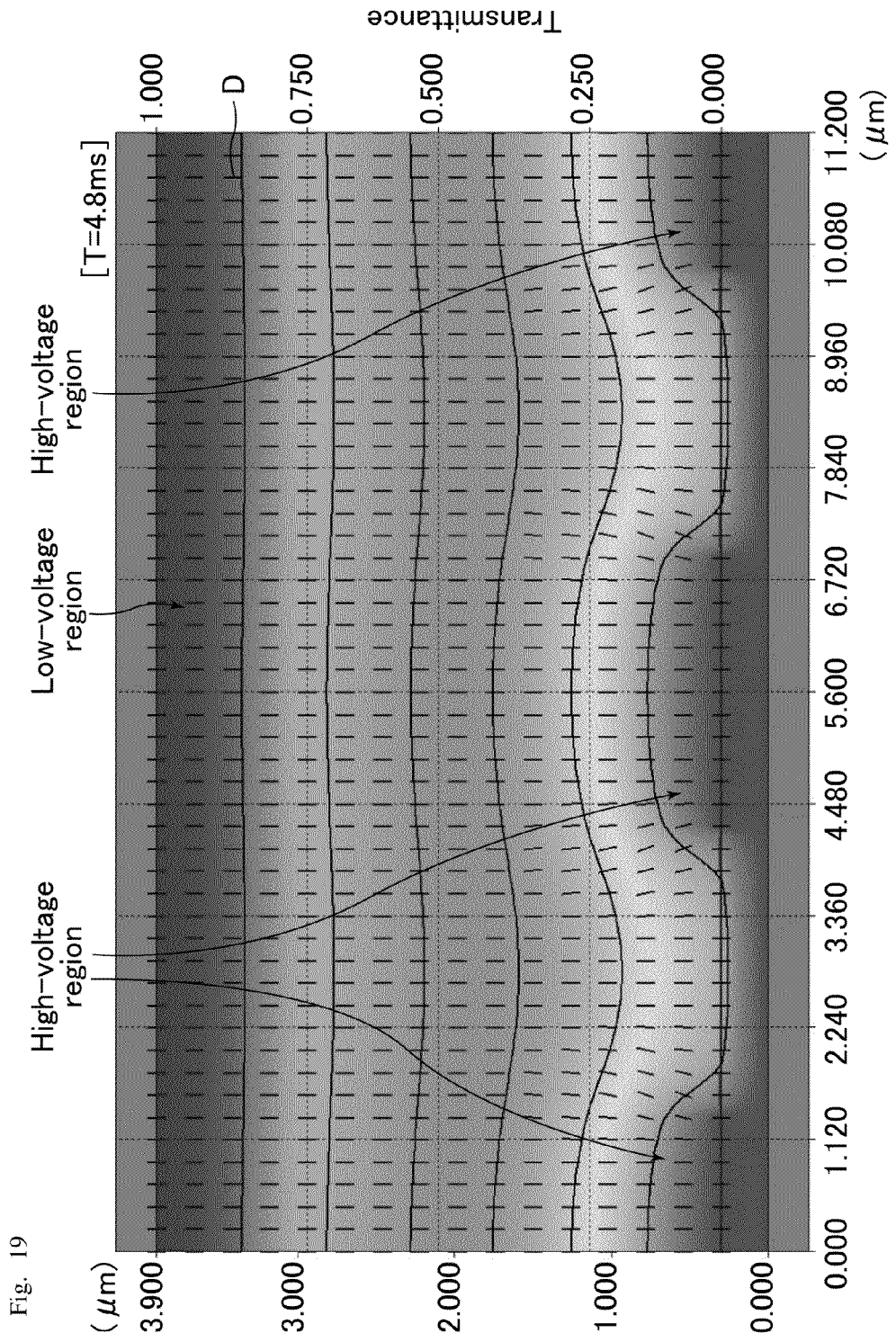
FIG. 19 shows simulation results relating to the liquid crystal display panel of Embodiment 3 in the presence of a vertical electric field.

FIG. 18 shows simulation results relating to the liquid crystal display panel of Embodiment 3 in the presence of a transverse electric field. FIG. 19 shows simulation results relating to the liquid crystal display panel of Embodiment 3 in the presence of a vertical electric field. FIG. 18 shows the liquid crystal display panel 2.0 msec after the state is turned into the ON state (T=2.8 msec). FIG. 19 shows the liquid crystal display panel 1.5 msec after the state is turned into the OFF state (T=4.8 msec). The symbol T (msec) in each of FIG. 18 and FIG. 19 indicates the value of the transverse axis (time axis) in the graph of FIG. 17.

The placement of the electrodes in Embodiment 1 shown in FIG. 4 (Embodiment 1) fails to sufficiently provide symmetry of the transmittance distribution. In contrast, Embodiment 3 where the lower electrode is disposed in the middle of the tooth space is capable of providing better symmetry for the transmittance distribution in the ON state (see the portion circled by the dot line in each of FIG. 4 and FIG. 18).

Further, the transmittance is sufficiently dropped in the OFF state similarly to the case where the lower electrode is a planar electrode without a slit (FIG. 19).

The other configurations in Embodiment 3 are the same as those in the aforementioned Embodiment 1. The other reference signs in the drawings relating to Embodiment 3 are the same as those in the drawings relating to Embodiment 1 except that the figure of "2" is added to the hundreds digit.

Embodiment 4 (a Mode in which a Lower Electrode is Disposed below All of the Comb-shaped Electrodes)

Figure 20:
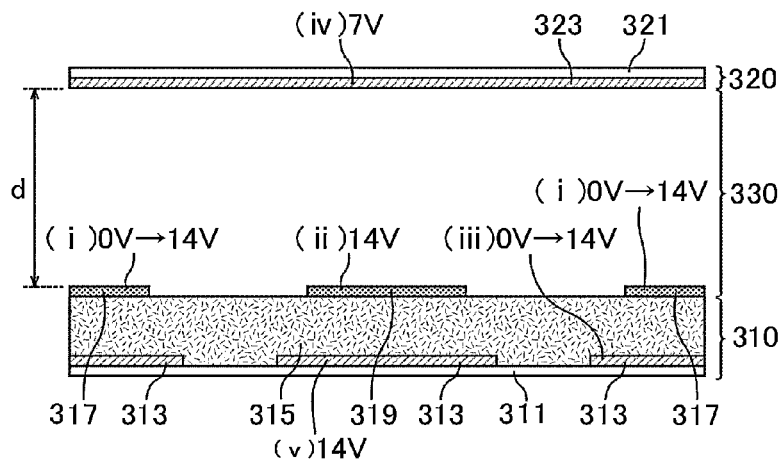
FIG. 20 is a schematic cross-sectional view showing a liquid crystal display panel of Embodiment 4.

FIG. 20 is a schematic cross-sectional view showing the liquid crystal display panel of Embodiment 4. Embodiment 4 shows a mode in which the lower electrode (iii) is disposed below all of the comb-shaped electrodes (i) and (ii). In other words, the slit of the lower electrode (the portion with no electrode) is formed (the edge of the lower electrode is formed) in the space of the comb-shaped electrodes (upper electrodes). In Embodiment 4, the lower electrode has a slit and overlaps substantially all of the pair of comb-shaped electrodes in a plan view of the main surfaces of the substrates. Embodiment 4 performs the calculation with the electric potential of the lower electrode set equal to that of the comb-shaped (upper) electrodes.

Figure 21:
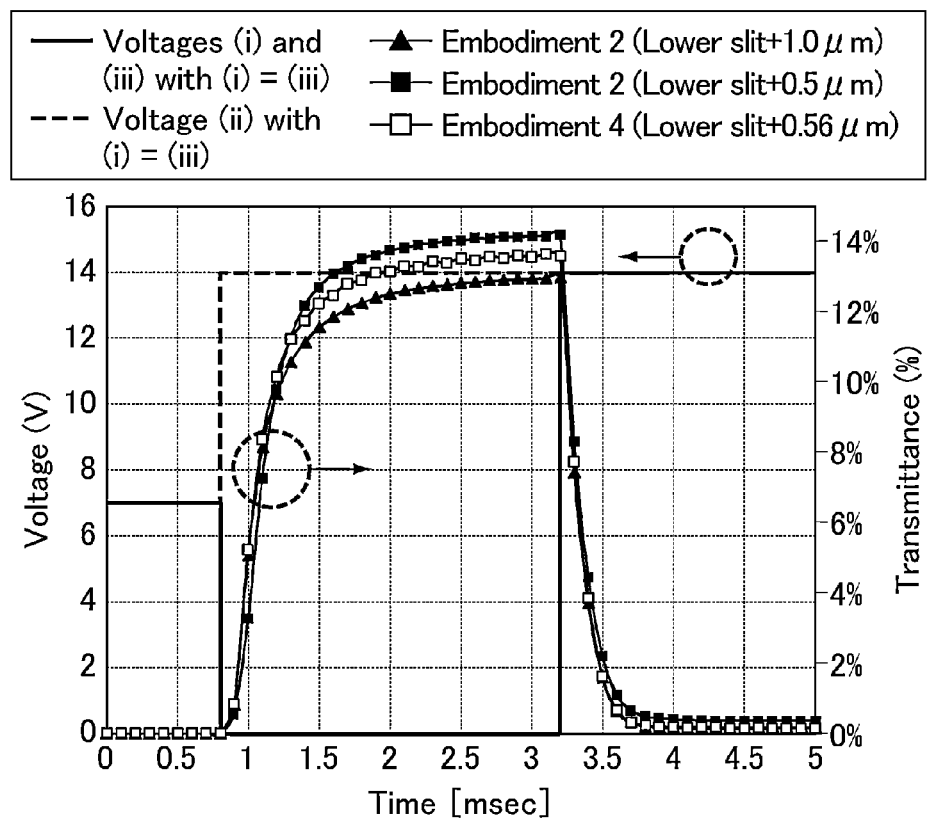
FIG. 21 is a graph showing the transmittance (%) and the voltage (V) versus the time (msec) in each mode of the liquid crystal display panel of Embodiment 2 and in the liquid crystal display panel of Embodiment 4.

FIG. 21 is a graph showing the transmittance (%) and the voltage (V) versus the time (msec) in each mode of the liquid crystal display panel of Embodiment 2 and the liquid crystal display panel of Embodiment 4. FIG. 21 shows the case where the electric potential of the lower electrode (iii) is set equal to that of the comb-shaped electrode (i) and the electric potential of the lower electrode (v) is set equal to that of the comb-shaped electrode (ii). As mentioned here, in Embodiment 4, the slit divides the lower electrode into two portions which are not electrically connected. In FIG. 21, the plots of black points indicate the cases of Embodiment 2. The plot of solid-white points indicates the case of Embodiment 4.

In comparison with Embodiment 2, the liquid crystal display panel of Embodiment 4 sufficiently improves the OFF-state characteristics while maintaining the transmittance to some extent.

The simulation is calculated in the structure where the center of the lower electrode (iii) is adjusted to that of the comb-shaped electrode (i) and the center of the lower electrode (v) is adjusted to that of the comb-shaped electrode (ii), and the lower electrode (iii) and the lower electrode (v) are each further extended laterally than the comb-shaped electrode (i) and the comb-shaped electrode (ii), respectively, by 0.56 µm in FIG. 20 (indicated as "Embodiment 4 (lower slit+0.56 µm)" in FIG. 21). The phrases "Embodiment 2 (+1.0 µm)" and "Embodiment 2 (+0.5 µm)" are the same as the phrases "lower slit+1.0 µm ((i)=(iii))" and "lower slit+0.5 µm ((i)=(iii))" in FIG. 10, respectively. They mean the modes in which the electric potential of the lower electrode (iii) is set equal to that of the comb-shaped electrode (i) and the lower electrode (iii) is extended from the comb-shaped electrode (i) by 1.0 µm and 0.5 µm, respectively, in a plan view of the main surfaces of the substrates. A preferred mode is that the lower electrode (iii) and the lower electrode (v) are extended laterally by 0.2 to 1 µm from the comb-shaped electrode (i) and the comb-shaped electrode (ii), respectively.

Figure 22:
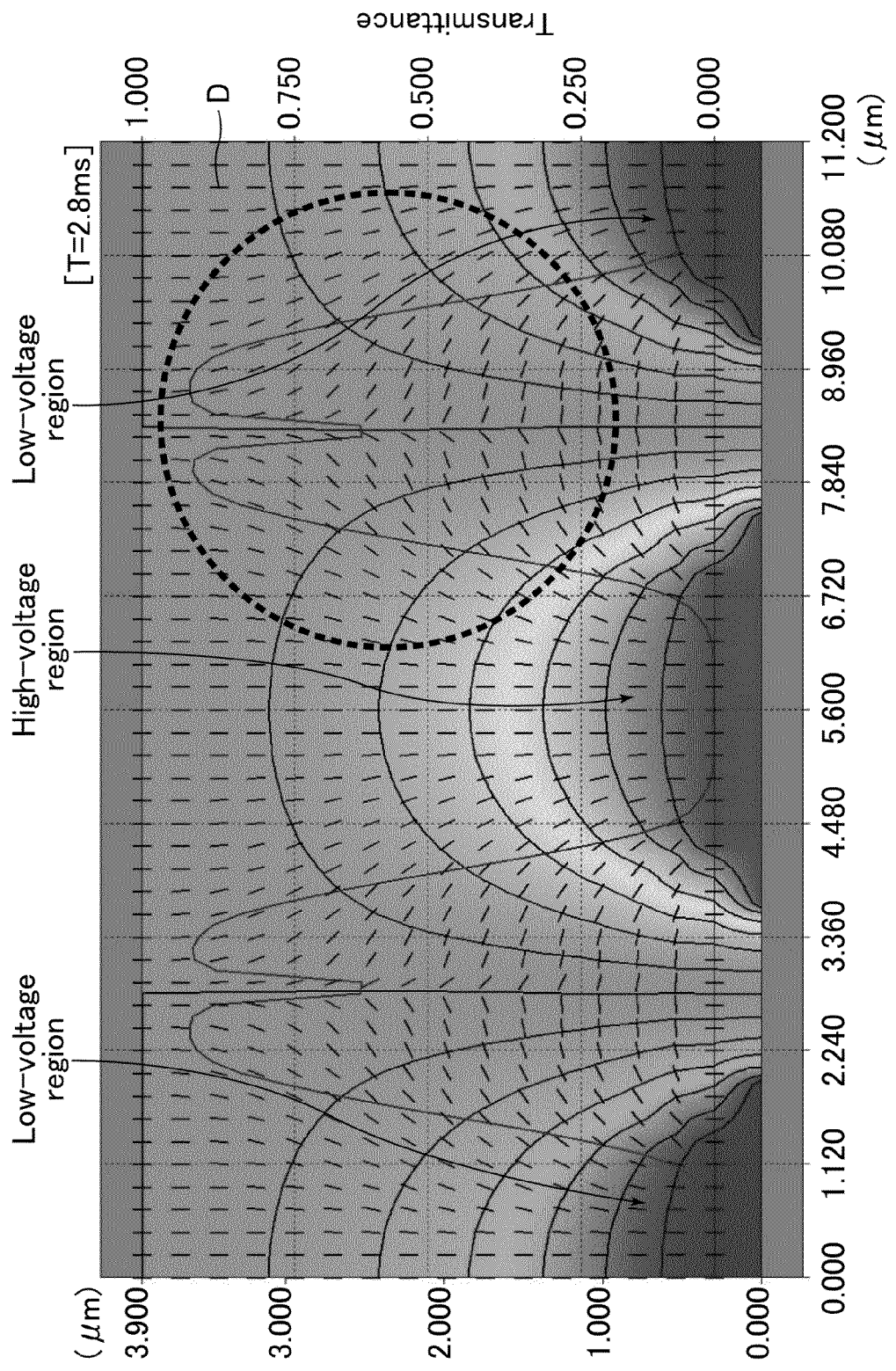
FIG. 22 shows simulation results relating to the liquid crystal display panel of Embodiment 4 in the presence of a transverse electric field.
Figure 23:
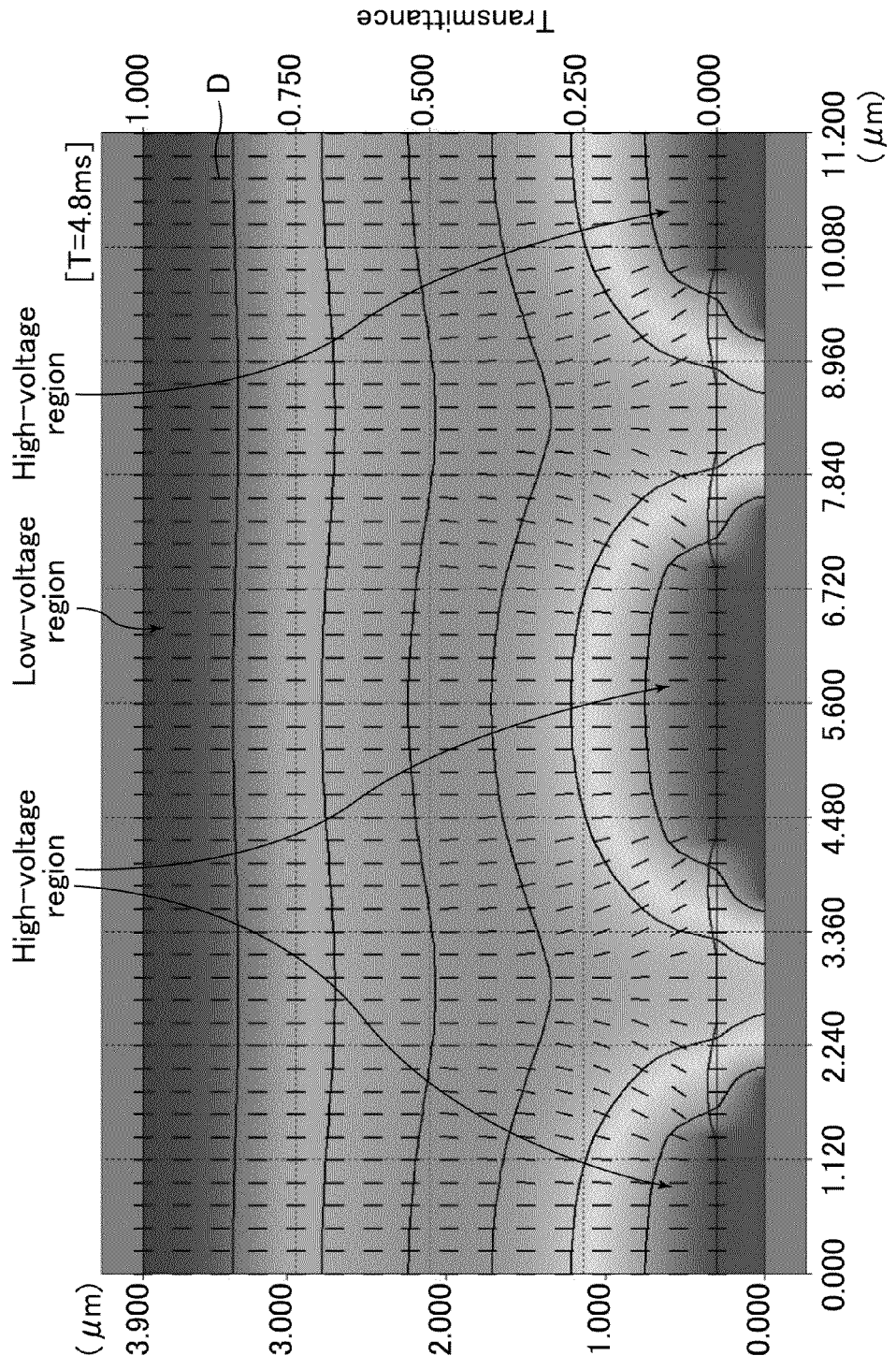
FIG. 23 shows simulation results relating to the liquid crystal display panel of Embodiment 4 in the presence of a vertical electric field.

FIG. 22 shows simulation results relating to the liquid crystal display panel of Embodiment 4 in the presence of a transverse electric field. FIG. 23 shows simulation results relating to the liquid crystal display panel of Embodiment 4 in the presence of a vertical electric field. FIG. 22 shows the liquid crystal display panel 2.0 msec after the state is turned into the ON state (T=2.8 msec). FIG. 23 shows the liquid crystal display panel 1.5 msec after the state is turned into the OFF state (T=4.8 msec). The symbol T (msec) in each of FIG. 22 and FIG. 23 indicates the value of the transverse axis (time axis) in the graph of FIG. 21. Embodiment 4 provides symmetric transmittance distribution.

The other configurations in Embodiment 4 are the same as those in the aforementioned Embodiment 1. The other reference signs in the drawings relating to Embodiment 4 are the same as those in the drawings relating to Embodiment 1 except that the figure of "3" is added to the hundreds digit.

The liquid crystal display panels of Embodiments 1 to 4 are easy to produce and are capable of providing a high response speed and a high transmittance. Further, they provide a response speed which enables field sequential driving. With respect to the TFT substrate and the opposed substrate, the electrode structure and others in the liquid crystal display panel and the liquid crystal display device of the present invention can be microscopically observed with, for example, a SEM (scanning electron microscope).

The aforementioned TFT driving method is a driving method in a subframe that is a drive cycle from a change of the liquid crystal to returning of the liquid crystal to the initial state. The driving method may include a driving operation that generates a potential difference between the electrodes of a pair of comb-shaped electrodes in the cycle of a subframe, a driving operation that generates a higher potential difference between the lower electrode and the counter electrode than that between the electrodes of a pair of comb-shaped electrodes, and a driving operation that generates substantially no potential difference between all of the electrodes, that is, the pair of comb-shaped electrodes, the lower electrode, and the counter electrode. This makes it possible to provide the above effects of the present invention and to control the alignment of the liquid crystal molecules suitably, thereby sufficiently reducing the transmittance in black display.

Comparative Example 1 (Fringe Electric Field Driving)

Figure 24:
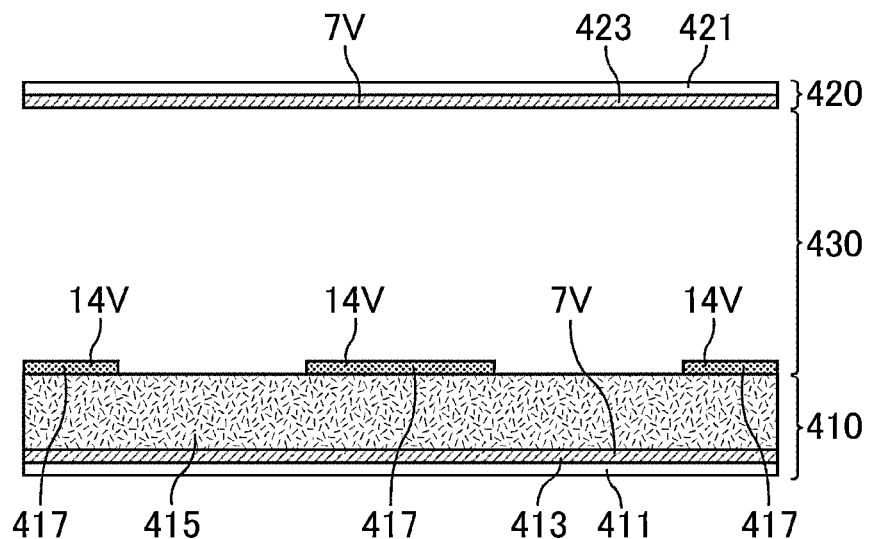
FIG. 24 is a schematic cross-sectional view showing a liquid crystal display panel of Comparative Example 1 in the presence of a fringe electric field.
Figure 25:
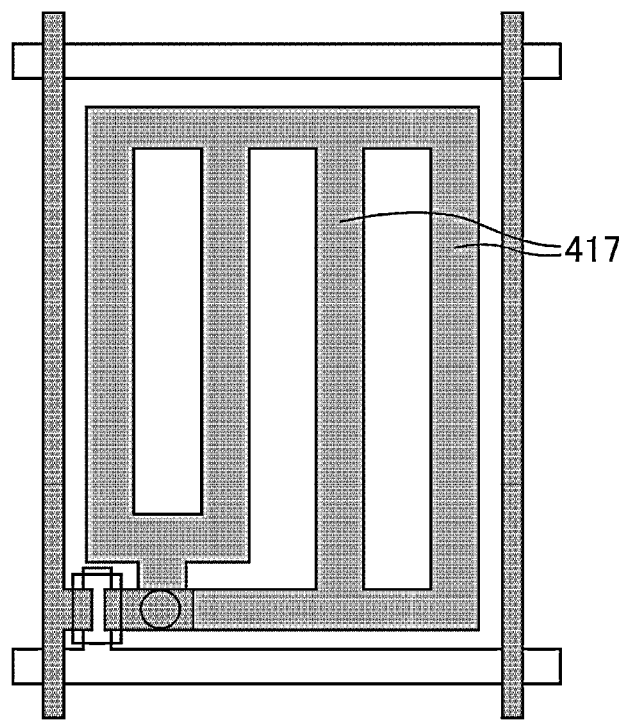
FIG. 25 is a schematic plan view showing the liquid crystal display panel shown in FIG. 24.
Figure 26:
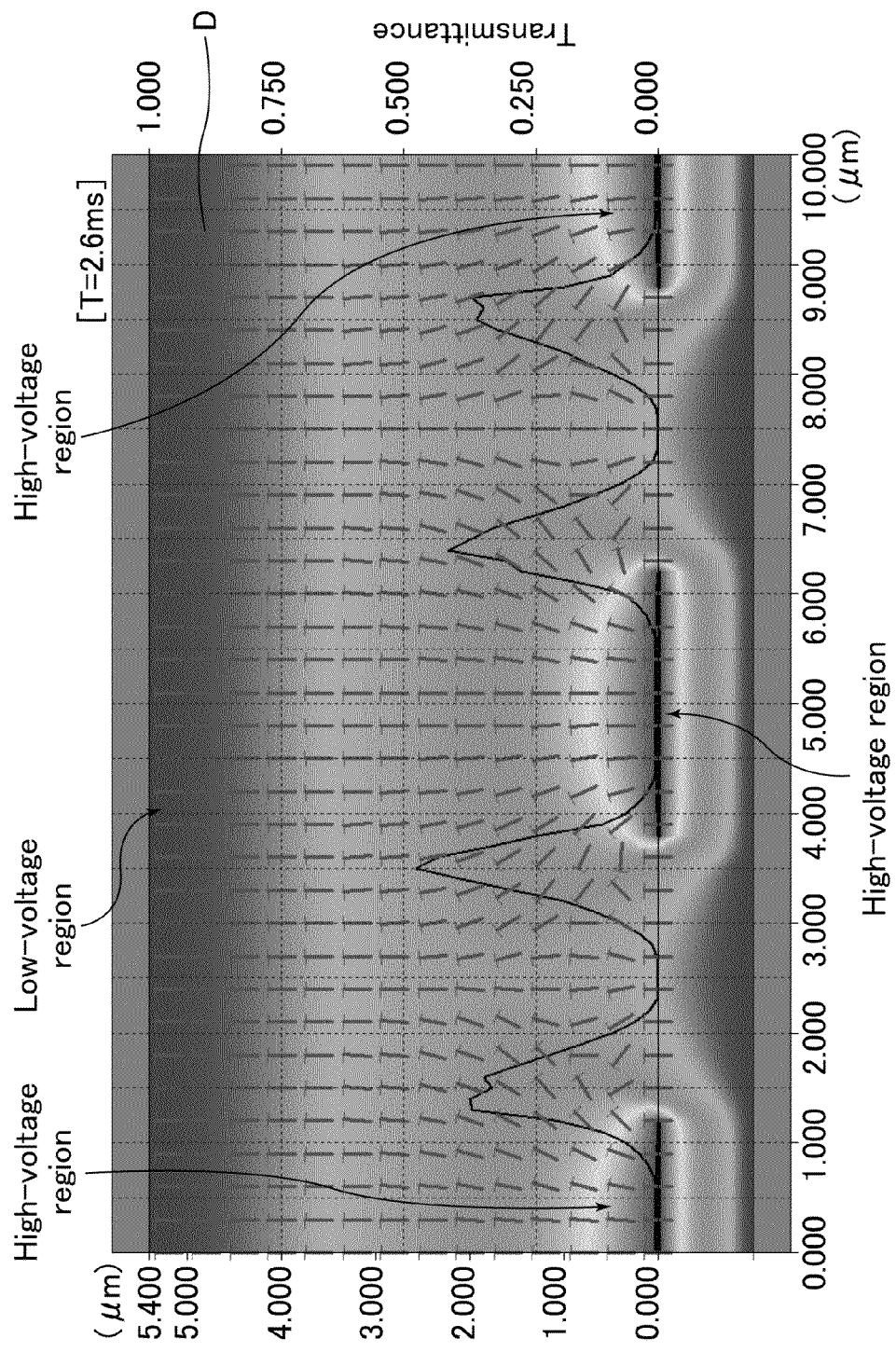
FIG. 26 shows simulation results relating to the liquid crystal display panel of Comparative Example 1 in the presence of a fringe electric field.

FIG. 24 is a schematic cross-sectional view showing a liquid crystal display panel of Comparative Example 1 in the presence of a fringe electric field. FIG. 25 is a schematic plan view showing the liquid crystal display panel shown in FIG. 24. FIG. 26 shows simulation results relating to the liquid crystal display panel of Comparative Example 1 in the presence of a fringe electric field.

The liquid crystal display panel of Comparative Example 1 generates a fringe electric field by FFS driving as in Patent Literature 1. FIG. 26 shows simulation results of director D, electric field, and transmittance distribution. The reference signs in FIG. 24 and FIG. 25 relating to Comparative Example 1 are the same as those in the drawings relating to Embodiment 1 except that the figure of "4" is added to the hundreds digit, unless otherwise specified.

In the FFS driving display (slit electrode is used instead of a pair of comb-shaped electrodes) disclosed in Patent Literature 1, a fringe electric field generated between the upper and lower electrodes on the lower substrate rotates the liquid crystal molecules. The upper electrode is a slit-formed electrode and the lower electrode is a planar electrode without a slit, which is shared by all the pixels. In this case, only the liquid crystal molecules near the slit electrode edge rotate. Thus, the transmittance in the simulation was as low as 3.6%. The transmittance was not improved contrary to the aforementioned embodiments (FIG. 26).

Comparative Example 2 (Lower Planar Electrode (ON-State (iii) 7 V))

Figure 27:
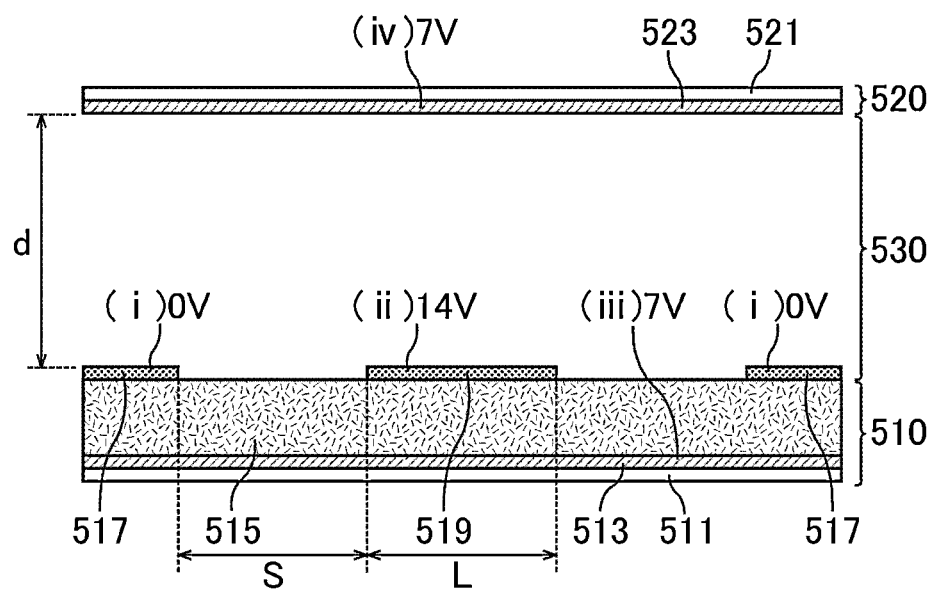
FIG. 27 is a schematic cross-sectional view showing a liquid crystal display panel of Comparative Example 2 in the presence of a transverse electric field.
Figure 28:
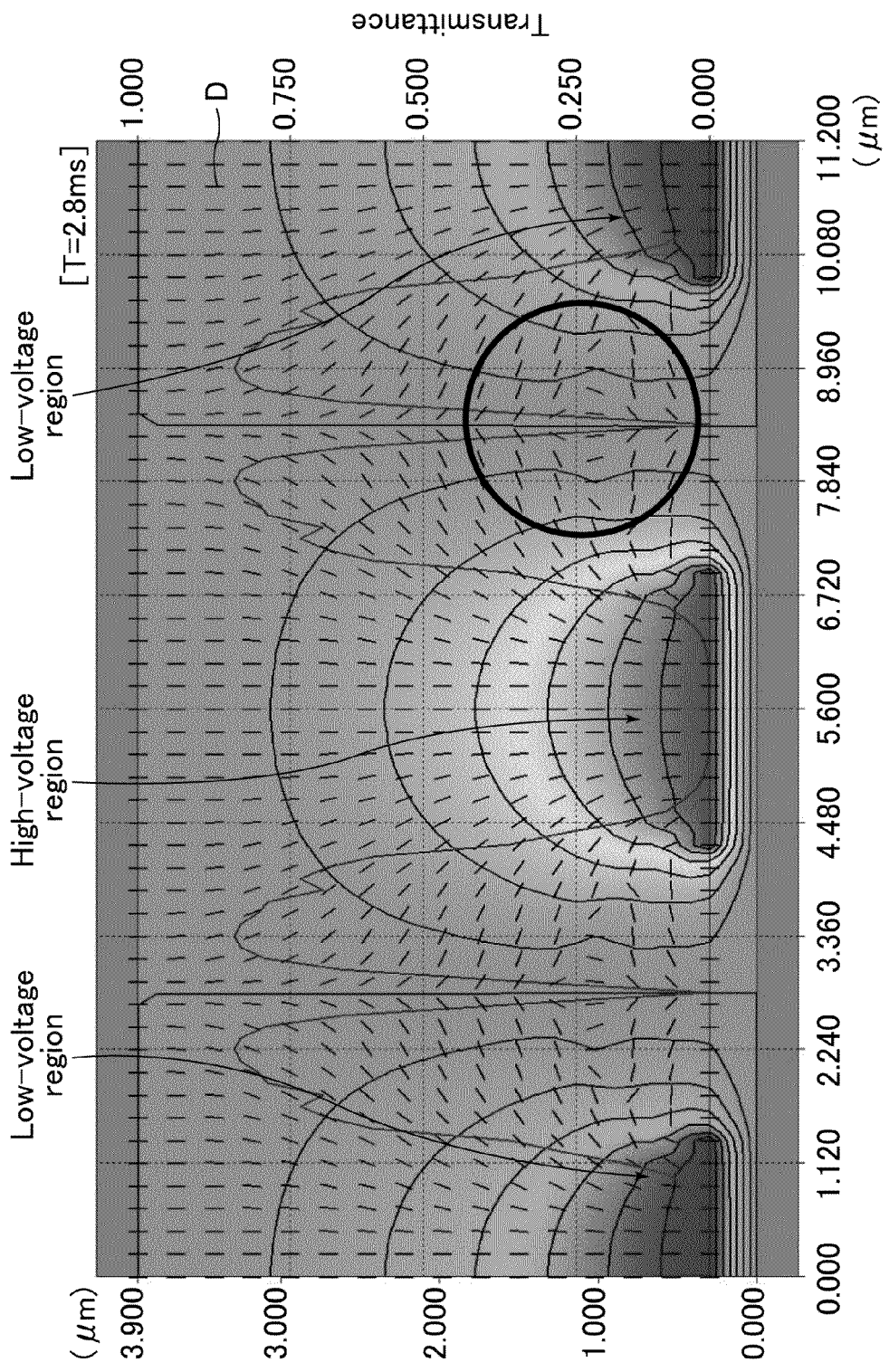
FIG. 28 shows simulation results relating to the liquid crystal display panel of Comparative Example 2 in the presence of a transverse electric field.
Figure 29:
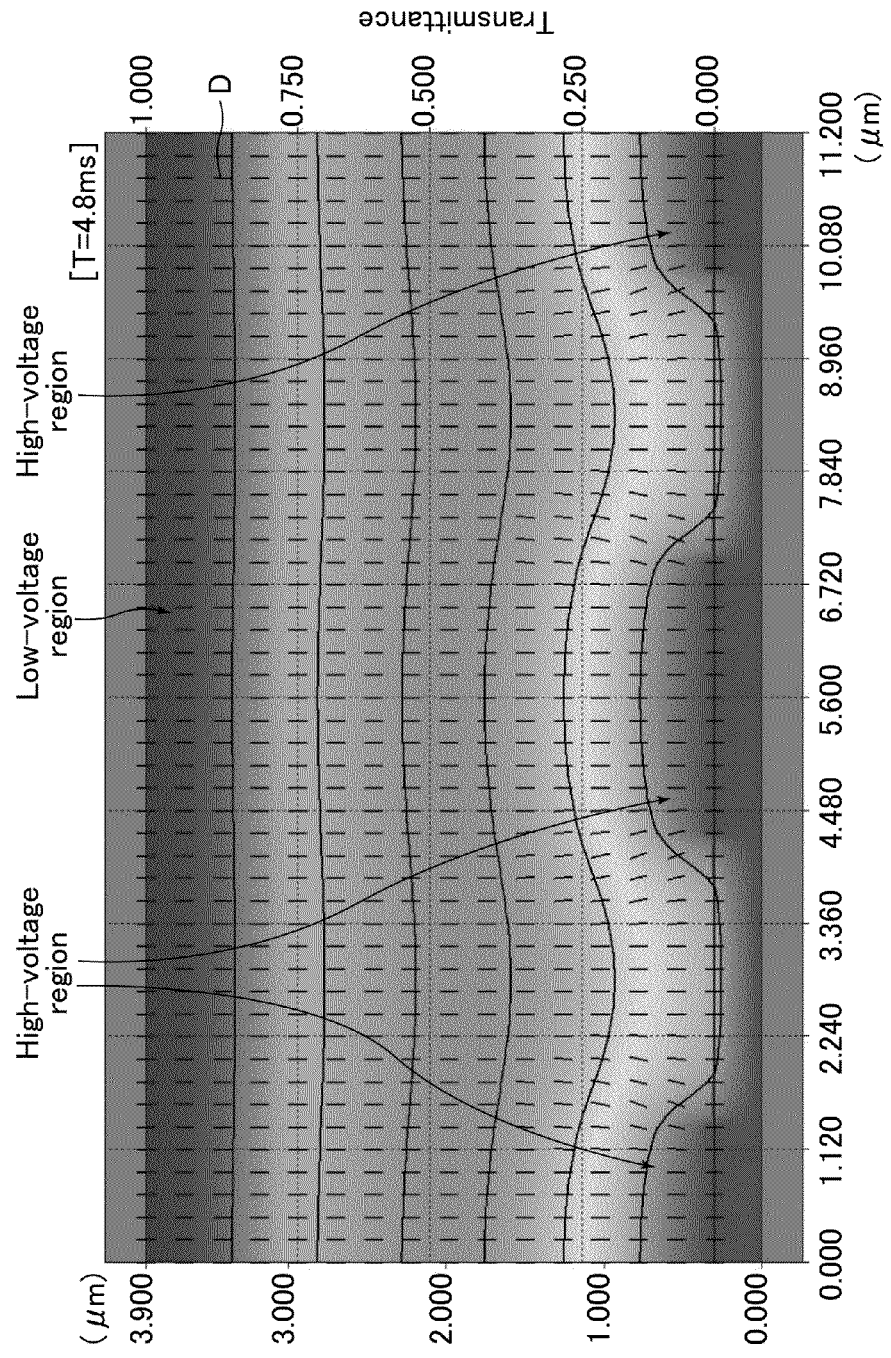
FIG. 29 shows simulation results relating to the liquid crystal display panel of Comparative Example 2 in the presence of a vertical electric field.

FIG. 27 is a schematic cross-sectional view showing a liquid crystal display panel of Comparative Example 2 in the presence of a transverse electric field. FIG. 28 shows simulation results relating to the liquid crystal display panel of Comparative Example 2 in the presence of a transverse electric field. FIG. 29 shows simulation results relating to the liquid crystal display panel of Comparative Example 2 in the presence of a vertical electric field.

Similar to the above embodiments, the liquid crystal display panel of Comparative Example 2 generates a transverse electric field by a pair of comb-shaped electrodes. FIG. 26 shows simulation results of the director D, electric field, and transmittance distribution (cell thickness 5.0 µm, slit gap 3.0 µm). The reference signs in FIG. 24 and FIG. 25 relating to Comparative Example 1 are the same as those in the drawings relating to Embodiment 1 except that the figure of "5" is added to the hundreds digit, unless otherwise specified.

In the three-layered electrode structure having a planar electrode without a slit as the lower electrode, voltages applied to the counter electrode and the lower electrode in the ON state shield the transverse electric field generated by the upper electrodes (comb-shaped electrodes), failing to provide a sufficient transmittance (transmittance simulation result: 12.2%). In other words, a lower electrode that has a planar shape without a slit pulls the transverse electric field in the ON state down to reduce the transmittance. In addition, the above disadvantage decreases the response speed in the ON state.

(Other Preferable Embodiments)

In the embodiments of the present invention, an oxide semiconductor TFT (e.g. IGZO) is preferably used. The following will describe this oxide semiconductor TFT in detail.

At least one of the first substrate and the second substrate usually includes a thin film transistor element. The thin film transistor element preferably includes an oxide semiconductor. In other words, an active layer of an active drive element (TFT) in the thin film transistor element is preferably formed using an oxide semiconductor film such as zinc oxide instead of a silicon semiconductor film. Such a TFT is referred to as an "oxide semiconductor TFT". The oxide semiconductor characteristically shows a higher carrier mobility and less unevenness in its properties than amorphous silicon. Thus, the oxide semiconductor TFT moves faster than an amorphous silicon TFT, has a high driving frequency, and is suitably used for driving of higher-definition next-generation display devices. In addition, the oxide semiconductor film is formed by an easier process than a polycrystalline silicon film. Thus, it is advantageously applied to devices requiring a large area.

The following characteristics markedly appear in the case of applying the liquid crystal driving method of the present embodiments especially to FSDs (field sequential display devices).

Figure 30:
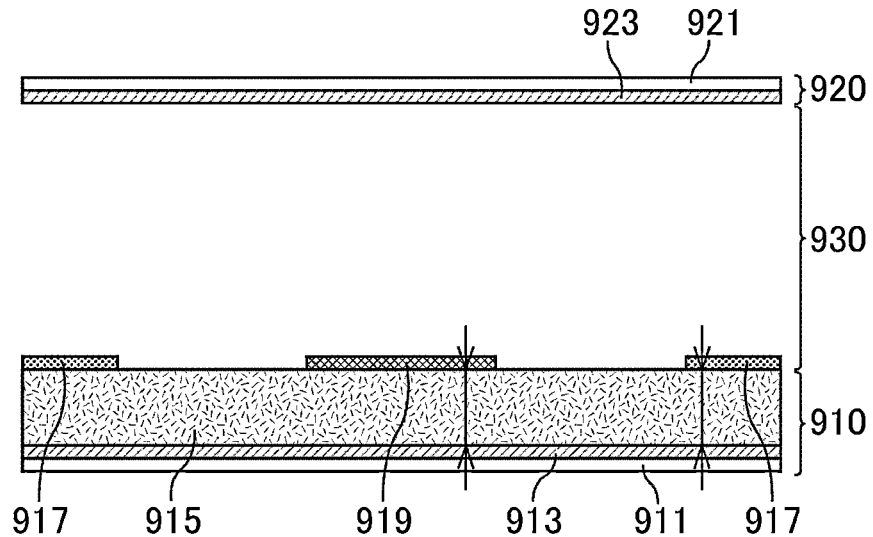
FIG. 30 is a schematic cross-sectional view showing one example of a liquid crystal display device used in the liquid crystal driving method of the present embodiment.

(1) The pixel capacitance is higher than that in a usual VA (vertical alignment) mode (FIG. 30 is a schematic cross-sectional view showing one example of a liquid crystal display device used in the liquid crystal driving method of the present embodiments; in FIG. 30, a large capacitance is generated between the upper electrode and the lower electrode at the portion indicated by an arrow and the pixel capacitance is higher than in the liquid crystal display device of usual vertical alignment (VA) mode). (2) One pixel of a FSD type is equivalent to three pixels (RGB), and thus the capacitance of one pixel is trebled. (3) The gate ON time is very short because 240 Hz or higher driving is required.

Advantages of applying the oxide semiconductor TFT (e.g. IGZO) are as follows.

Based on the characteristics (1) and (2), a 52-inch device has a pixel capacitance of about 20 times as high as a 52-inch UV2A 240-Hz drive device.

Thus, a transistor produced using conventional a-Si is as great as about 20 times or more, disadvantageously resulting in an insufficient aperture ratio.

The mobility of IGZO is about 10 times that of a-Si, and thus the size of the transistor is about 1/10.

Although the liquid crystal display device using color filters (RGB) has three transistors, the FSD type device has only one transistor. Thus, the device can be produced in a size as small as or smaller than that with a-Si.

As the size of the transistor becomes smaller, the Cgd capacitance also becomes smaller. This reduces the load on the source bus lines.

(Specific Examples)

Figure 31:
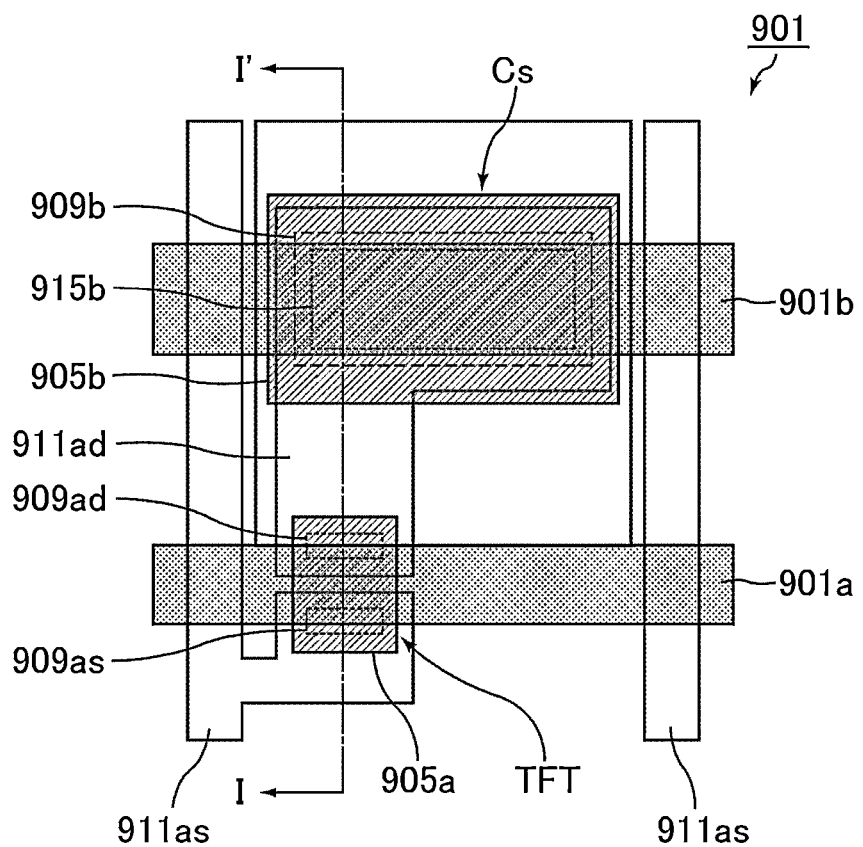
FIG. 31 is a schematic plan view showing an active drive element and its vicinity used in the present embodiment.
Figure 32:
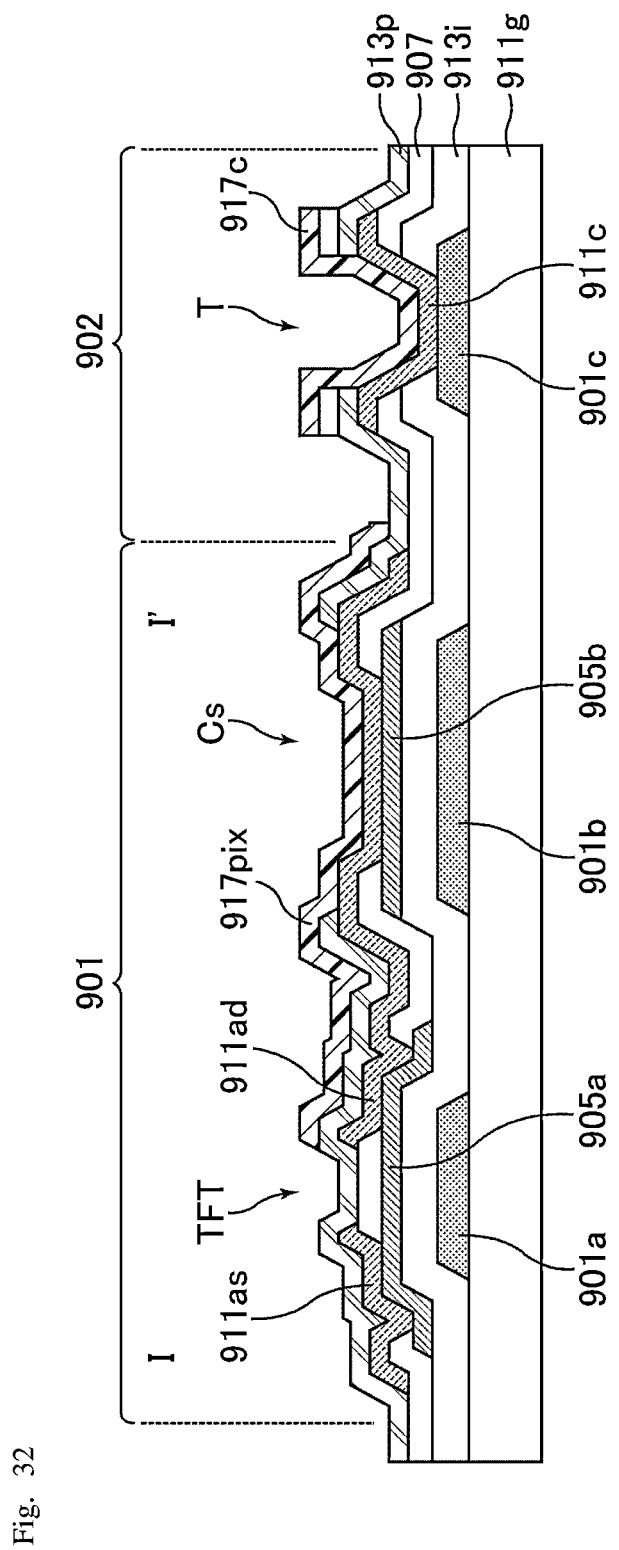
FIG. 32 is a schematic cross-sectional view showing the active drive element and its vicinity used in the present embodiment.

FIG. 31 and FIG. 32 each show a structure (example) of the oxide semiconductor TFT. FIG. 31 is a schematic plan view showing the active drive element and its vicinity used in the present embodiment. FIG. 32 is a schematic cross-sectional view showing an active drive element and its vicinity used in the present embodiment. The symbol T indicates a gate and source terminal. The symbol Cs indicates an auxiliary capacitance.

The following will describe one example (the portion in question) of a production process of the oxide semiconductor TFT.

Active layer oxide semiconductor layers 905a and 905b of an active drive element (TFT) using the oxide semiconductor film are formed as follows.

At first, an In—Ga—Zn—O semiconductor (IGZO) film with a thickness of 30 nm or greater but 300 nm or smaller is formed on an insulating layer 913i by sputtering. Then, a resist mask is formed by photolithography so as to cover predetermined regions of the IGZO film. Next, portions of the IGZO film other than the regions covered by the resist mask are removed by wet etching. Thereafter, the resist mask is peeled off. This provides island-shaped oxide semiconductor layers 905a and 905b. The oxide semiconductor layers 905a and 905b may be formed using other oxide semiconductor films instead of the IGZO film.

Next, an insulating layer 907 is deposited on the whole surface of a substrate 911g and the insulating layer 907 is patterned.

Specifically, at first, an $SiO_2$ film (thickness: about 150 nm, for example) as an insulating layer 907 is formed on the insulating layer 913i and the oxide semiconductor layers 905a and 905b by CVD. The insulating layer 907 preferably includes an oxide film such as SiOy.

Use of the oxide film can recover oxygen deficiency on the oxide semiconductor layers 905a and 905b by the oxygen in the oxide film, and thus it more effectively suppresses oxygen deficiency on the oxide semiconductor layers 905a and 905b. Here, a single layer of an $SiO_2$ film is used as the insulating layer 907. Still, the insulating layer 907 may have a stacked structure of an $SiO_2$ film as a lower layer and an SiNx film as an upper layer.

The thickness (in the case of a stacked structure, the sum of the thicknesses of the layers) of the insulating layer 907 is preferably 50 nm or greater but 200 nm or smaller. The insulating layer with a thickness of 50 nm or greater more securely protects the surfaces of the oxide semiconductor layers 905a and 905b in the step of patterning the source and drain electrodes. If the thickness of the insulating layer exceeds 200 nm, the source electrodes and the drain electrodes may have a higher step, so that breaking of lines may occur.

The oxide semiconductor layers 905a and 905b in the present embodiment are preferably formed from a Zn—O semiconductor (ZnO), an In—Ga—Zn—O semiconductor (IGZO), an In—Zn—O semiconductor (IZO), or a Zn—Ti—O semiconductor (ZTO). Particularly preferred is an In—Ga—Zn—O semiconductor (IGZO).

The present mode provides certain effects in combination with the above oxide semiconductor TFT. Still, the present mode can be driven using a known TFT element such as an amorphous Si TFT or a polycrystalline Si TFT.

The aforementioned modes of the embodiments may be employed in appropriate combination as long as the combination is not beyond the spirit of the present invention.

The present application claims priority to Patent Application No. 2011-142350 filed in Japan on Jun. 27, 2011 under the Paris Convention and provisions of national law in a designated State, the entire contents of which are hereby incorporated by reference.

REFERENCE SIGNS LIST 10, 110, 210, 310, 410, 510: array substrate
11, 21, 111, 221, 311, 321, 411, 421, 511, 521: glass substrate
13, 113, 213, 313, 413, 513: lower electrode 23, 123, 223, 323, 423, 523: counter electrode
15, 115, 215, 315, 415, 515: insulating layer
16, 116, 216, 316, 516: pair of comb-shaped electrodes
17, 19, 117, 119, 217, 219, 317, 319, 517, 519: comb-shaped electrode
20, 120, 220, 320, 420, 520: opposed substrate
30, 130, 230, 330, 430, 530: liquid crystal layer
31: liquid crystal (liquid crystal molecules)
417: slit electrode
D: director

The invention claimed is:

1. A liquid crystal display panel, comprising
a first substrate, a second substrate, and a liquid crystal layer disposed between the substrates,
the first substrate and the second substrate comprising electrodes,
the electrodes of the second substrate including a pair of comb-shaped electrodes and a slit-formed electrode, and
the slit-formed electrode of the second substrate being disposed below the pair of comb-shaped electrodes with an insulating layer interposed therebetween and being driven independently of the pair of comb-shaped electrodes,
wherein the slit-formed electrode does not overlap the pair of comb-shaped electrodes in a plan view of the main surfaces of the substrates,
wherein portions of the slit-formed electrode of the second substrate are electrically connected in a pixel line, and
wherein the slit-formed electrode of the second substrate includes commonly connected portions corresponding to even-numbered lines and commonly connected portions corresponding to odd-numbered lines, and is driven to invert electric potential changes of the portions corresponding to even-numbered lines and the portions corresponding to odd-numbered lines in response to application of a voltage.

2. The liquid crystal display panel according to claim 1, wherein at least part of an edge of the slit-formed electrode does not overlap the pair of comb-shaped electrodes in a plan view of the main surfaces of the substrates.

3. The liquid crystal display panel according to claim 2, wherein the at least part of an edge of the slit-formed electrode is apart from the pair of comb-shaped electrodes by 0.5 μm or greater but 0.7S μm or smaller in a plan view of the main surfaces of the substrates, where S (μm) is a width of a gap between tooth portions of the pair of comb-shaped electrodes.

4. The liquid crystal display panel according to claim 1, wherein the slit-formed electrode exists on a layer different from the layer on which the pair of comb-shaped electrodes exists.

5. The liquid crystal display panel according to claim 1, wherein the liquid crystal layer includes liquid crystal molecules which are aligned in the orthogonal direction to main surfaces of the substrates with a voltage lower than a threshold voltage.

6. The liquid crystal display panel according to claim 1, wherein the electrode of the first substrate is a planar electrode.

7. The liquid crystal display panel according to claim 1, wherein the liquid crystal layer includes liquid crystal molecules with positive anisotropy of dielectric constant.

8. The liquid crystal display panel according to claim 1, wherein at least one of the first substrate and the second substrate comprises a thin film transistor element, and
the thin film transistor element comprises an oxide semiconductor.

9. A liquid crystal display device, comprising
the liquid crystal display panel according to claim 1.

10. The liquid crystal display panel according to claim 1, wherein the second substrate is provided with thin-film transistors, and gate bus lines and source bus lines which are separately connected to respective ones of the thin-film transistors, and
pixels defined by the gate bus lines and the source bus lines are driven independently.

* * * * *